US007453966B2

(12) United States Patent
Tang et al.

(10) Patent No.: US 7,453,966 B2
(45) Date of Patent: Nov. 18, 2008

(54) GRADIENT BASED METHOD AND APPARATUS FOR OFDM SUB-CARRIER POWER OPTIMIZATION

(75) Inventors: Clive K. Tang, Irving, TX (US); Victor J. Stolpman, Irving, TX (US)

(73) Assignee: Nokia Corporation, Espoo (FI)

( * ) Notice: Subject to any disclaimer, the term of this patent is extended or adjusted under 35 U.S.C. 154(b) by 576 days.

(21) Appl. No.: 11/035,297

(22) Filed: Jan. 12, 2005

(65) Prior Publication Data

US 2006/0153309 A1 Jul. 13, 2006

(51) Int. Cl.
*H04L 25/08* (2006.01)
(52) U.S. Cl. ...................................... 375/348; 375/144
(58) Field of Classification Search ................ 375/130, 375/140, 144, 220, 316, 346, 348, 353, 354
See application file for complete search history.

(56) References Cited

U.S. PATENT DOCUMENTS

| 2004/0141548 A1 | 7/2004 | Shattil ......................... 375/146 |
| 2005/0032476 A1* | 2/2005 | Chae et al. ..................... 455/65 |

OTHER PUBLICATIONS

"Power Allocation for Multi-band OFDM UWB Communication Networks", Zhengyuan Xu et al., IEEE 2004, pp. 368-372.
"Multiple Users Adaptive Modulation Schemes for MC-CDMA", Clive Tang et al., IEEE 2004, pp. 3823-3827.
"Adaptive Turbo Coded Modulation for OFDM Transmissions", Xiaoming She et al., Proceedings of ICCT 2003, pp. 1491-1495.
"Adaptive Modulatin Techniques for Duplex OFDM Transmission", Thomas Keller et al., IEEE Transactions On Vehicular Technology, vol. 49, No. 5, Sep. 2000, pp. 1893-1906.
"Network-assisted link-adaptation with power control and channel re-assignment in wireless networks", Dilip Krishnaswamy, Cellular Communications Division, Intel Corporation, 6 pages, 2002.
"Computationally Efficient Optimal Power Allocation Algorithms for Multicarrier Communication Systems", Brian S. Krongold, et al., IEEE Transactions On Communications, vol. 48, No. 1, 2000, pp. 23-27.
"Adaptive Bit And Power Allocation With Adaptive Transmit Diversity For Broadband MISO/OFDM Wireless Transmission", Qiu Yong-hong et al., IEEE Int. Conf. Neural Networks & Signal Processing, Dec. 2003, pp. 1472-1476.

(Continued)

*Primary Examiner*—Dac V Ha
(74) *Attorney, Agent, or Firm*—Harrington & Smith, PC

(57) ABSTRACT

In one aspect thereof this invention provides a method to increase data throughput in an Orthogonal Frequency Division Multiplex (OFDM) wireless communications system. The method includes modeling data throughput as a function of received Signal to Noise Ratio (SNR) with a sigmoid function to produce a throughput curve characterized as having a lower knee region and an upper knee region; and performing a gradient ascent search along the throughput curve by varying the power of a plurality of sub-carriers so as to remove power from any sub-carrier having a received SNR to the left of the lower knee region, and to re-allocate the removed power to sub-carriers having a received SNR to the right of the lower knee region.

51 Claims, 17 Drawing Sheets

OTHER PUBLICATIONS

"Constant Rate Adaptive Modulation with Selection Transmit Diversity for Broadband OFDM Systems", Yonghong Qiu et al., IEEE 2003 International Symposium on Person, Indoor and Mobile Radio Communication Proceedings, pp. 722-726.

"Subcarrier Allocation and Power Control for OFDMA", Didem Kivanc et al., IEEE 2000, pp. 147-151.

"A Modified Sub-Optimum Adaptive Bit and Power Allocation Algorithm in Wideband OFDM System", Li Zhen et al., IEEE 2003, pp. 1589-1592.

"Peak-to-Average Power Radio Suppression Schemes in DFT Based OFDM", Young-Seo Park et al., IEEE 2000, pp. 292-297.

* cited by examiner

GRADIENT ASCENT SEARCH, NO
CARRIER DISABLING

GRADIENT ASCENT SEARCH, NO CARRIER DISABLING,
DIFFERENT MCSs ALLOWED IN DIFFERENT SUB-CARRIERS

GRADIENT ASCENT SEARCH
WITH SUB-CARRIER DISABLING

GRADIENT ASCENT SEARCH, WITH SUB-CARRIER DISABLING, DIFFERENT MCSs ALLOWED IN DIFFERENT SUB-CARRIERS

GRADIENT BASED METHOD AND APPARATUS FOR OFDM SUB-CARRIER POWER OPTIMIZATION

TECHNICAL FIELD

This invention relates generally to wireless communications systems and methods and, more specifically, relates to orthogonal frequency division multiplex (OFDM) wireless communications systems, including, but not limited to, those that operate in accordance with code division multiple access (CDMA) waveforms and techniques.

BACKGROUND

The OFDM technique has been successfully deployed in indoor wireless Local Area Network (LAN) and outdoor broadcasting applications. OFDM reduces the influence of inter-symbol-interference with a complexity less than that of typical single carrier adaptive equalizers, and has been found to work well in multipath fading channels. These and other advantages render OFDM as a strong candidate for use in proposed 4 G mobile communication systems.

Under a frequency selective fading channel each sub-carrier is attenuated individually. The resultant sub-channel frequency functions are frequency-variant and may also be time-variant, hence adaptive modulation may be appropriately applied to improve the error performance and data throughput in an OFDM modem by assigning different transmission power and/or modulation and coding schemes to different sub-carriers. See, for example, T. Keller and L. Hanzo, "Adaptive Modulation Techniques for Duplex OFDM Transmission", IEEE Trans. on Vehicular Technology, Vol. 49, No. 5, September 2000, pp. 1893-1906, and B. S. Krongold, K. Ramchandran and D. L. Jones, "Computationally Efficient Optimal Power Allocation Algorithms for Multicarrier Communication Systems", IEEE Trans. on Communications, Vol. 48, No. 1, 2000, pp. 23-27.

One fundamental issue that arises when attempting to deploy adaptive modulation is the determination of the number of bits and/or power to be loaded into each of the sub-carriers. One known solution is referred to as a "parameter optimization approach" that formulates the bit/power loading issue as an analytical parameter optimization problem. Families of analytically-derived bit/power loading algorithms to maximize a performance criterion subject to one or more constraints for an un-coded OFDM system are readily available. Unfortunately, channel coding, which is frequently employed to combat fading, may be difficult to incorporate in such an analytical approach. In fact, there is little literature available that concerns the optimization of data throughput in a coded OFDM system. As a result, the issue of sub-carrier power loading in a coded OFDM packet-based modem, to improve or maximize data throughput under a fading channel, is an unresolved problem in those OFDM systems that employ channel coding.

It is known to employ heuristic methods, or to employ analytical means under un-coded conditions. One known approach is to treat the issue as a parameter optimization problem and to then employ analytical optimization techniques (see, again, B. S. Krongold, K. Ramchandran and D. L. Jones, "Computationally Efficient Optimal Power Allocation Algorithms for Multicarrier Communication Systems", IEEE Trans. on Communications, Vol. 48, No. 1, 2000, pp. 23-27). Typically such approaches seek to maximize the rate (bits/ OFDM symbol) subject to a Bit Error Rate/Symbol Error Rate (BER/SER) bound and other constraints (e.g., power). However, it can be shown that this approach does not necessarily optimize the net throughput, especially in a packet-based system. Further, channel coding would be very difficult to incorporate in such an approach.

For instance, the above-referenced Krongold et al. proposed a Lagrange bisection solution that maximizes the rate (bits/symbol) subject to a total power constraint and a fixed error probability bound. An additional practical constraint is that the rate should be an integer number of bits/symbol. As was noted, however, channel coding, which is frequently employed to combat channel-induced errors, may be difficult to incorporate in such an analytical approach. Meanwhile in a packet-data based system with channel coding, it may be more desirable to maximize the net data throughput (also known as "goodput" in some literature) defined as (1-PER) *data_rate, where data_rate is the actual data rate in packets/ symbols per time unit (or other normalized values), rather than the raw data rate. However this is difficult to perform analytically.

SUMMARY OF THE PREFERRED EMBODIMENTS

The foregoing and other problems are overcome, and other advantages are realized, in accordance with the presently preferred embodiments of these teachings.

In one aspect thereof this invention provides a method to increase data throughput in an OFDM wireless communications system. The method includes modeling data throughput as a function of received Signal to Noise Ratio (SNR) with a sigmoid function to produce a throughput curve characterized as having a lower knee region and an upper knee region; and performing a gradient ascent search along the throughput curve by varying the power of a plurality of sub-carriers so as to remove power from any sub-carrier having a received SNR to the left of the lower knee region, and to re-allocate the removed power to sub-carriers having a received SNR to the right of the lower knee region.

In another aspect thereof this invention provides apparatus operable to increase data throughput in an OFDM wireless communications system having at least one data processor operating under control of a stored program, and coupled to OFDM transmission circuitry. The at least one data processor is operable to model data throughput as a function of received SNR with a sigmoid function to produce a throughput curve characterized as having a lower knee region and an upper knee region; and to perform a gradient ascent search along the throughput curve by varying the power of a plurality of sub-carriers so as to remove power from any sub-carrier having a received SNR to the left of the lower knee region, and to re-allocate the removed power to sub-carriers having a received SNR to the right of the lower knee region.

In a further aspect thereof this invention provides a computer readable memory medium that stores computer program instructions for increasing data throughput in an OFDM wireless communications system. The computer program instructions implement operations that comprise performing a gradient ascent search along a data throughput curve, where the data throughput curve is modeled using a received SNR as a sigmoid function to produce the data throughput curve to be characterized as having a lower knee region and an upper knee region. The gradient ascent search operates to vary the power of a plurality of sub-carriers so as to remove power from any sub-carrier having a received SNR to the left of the lower knee region, and to re-allocate the removed power to sub-carriers having a received SNR to the right of the lower knee region.

In a still further aspect thereof this invention provides a computer readable memory medium that stores computer program instructions for increasing data throughput in an OFDM wireless communications system. The computer program instructions implement operations that comprise performing a multi-stage gradient ascent search along a data throughput curve, where the data throughput curve is modeled using the received SNR as a sigmoid function to produce the data throughput curve to be characterized as having a lower knee region and an upper knee region. The gradient ascent search operates to vary the power of a plurality of sub-carriers so as to remove power from any sub-carrier having a received SNR to the left of the lower knee region, and to re-allocate the removed power to sub-carriers having a received SNR to the right of the lower knee region. During a first stage of the gradient ascent search an operation identifies sub-carriers to be disabled, and during a second stage of the gradient ascent search a further operation allocates power only to retained sub-carriers at the expense of disabled sub-carriers.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
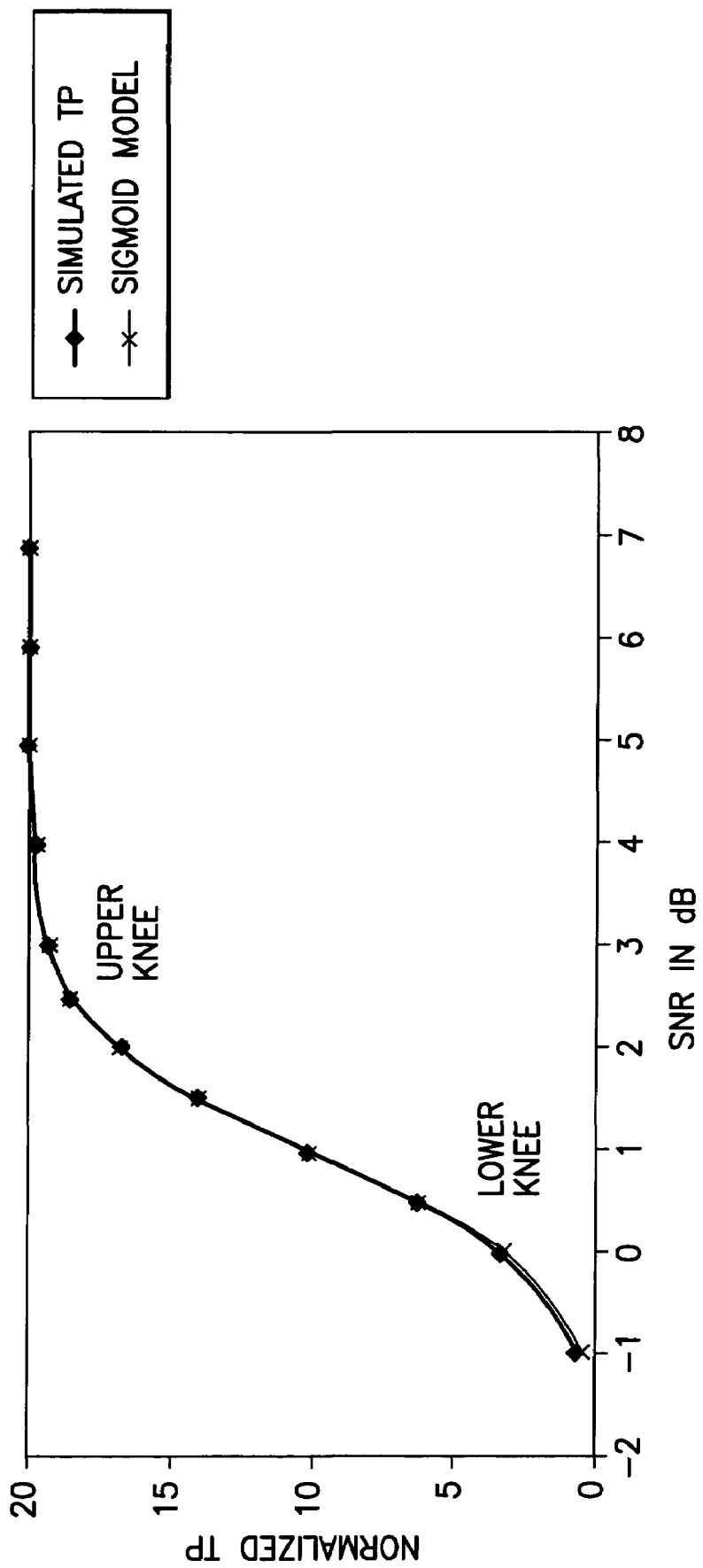
FIG. 1 shows modeling of a throughput curve by a sigmoid function.

An aspect of the embodiments of this invention is to provide a gradient-based search scheme that adapts the power of sub-carriers to maximize or improve the net data throughput, subject to a total power constraint. The gradient-based search scheme may be deployed in both un-coded and coded OFDM systems.

As was noted above, there are families of analytically derived bit/power loading algorithms to maximize a performance criterion (e.g. data rate) subject to one or more constraints (e.g., the SER/BER bound) that are available for an un-coded OFDM system. However, a closed form expression to solve for the bit/power loading that maximizes the net throughput is extremely difficult, if not impossible, to obtain for a coded OFDM system.

In accordance with the teachings of this invention there is provided a gradient based search scheme that adapts the power of sub-carriers to maximize or improve the net data throughput, subject to a total power constraint. The data throughput as a function of the received Signal to Noise Ratio (SNR) is first modeled by an analytically treatable sigmoid function. A gradient-based constrained optimization scheme with backtracking is then applied to vary the power of individual sub-carriers. One goal of this approach is to remove power from the "bad" sub-carriers, i.e., those sub-carrier(s) with a received SNR to the left of the lower sigmoid knee, and to allocate this power to those sub-carrier(s) having a received SNR to the right of the lower sigmoid knee. This approach is based at least in part on the assumption that the bad sub-carriers do not contribute much, if anything, to the total throughput. For those sub-carriers in the intermediate area between the upper and lower sigmoid knees, their power is preferably increased within the total power constraint to beyond the upper knee region where the resultant throughput is about the best achievable. After the optimization process, the instantaneous received SNRs of the sub-carriers are shifted either to the left of the lower knee or to the right of the upper knee, resulting in virtually the best possible total throughput for a given channel realization. By disabling the bad sub-carriers, the error performance can further be improved without sacrificing the increase in throughput.

The gradient-based search technique in accordance with the embodiments of this invention beneficially optimizes or maximizes the data throughput (TP) in a coded OFDM system. The net data throughput, as a function of the received sub-channel SNR, is first mathematically modeled by a sigmoid function. A constrained gradient ascent with a back-track-track-line search is then applied to alter the power of the sub-carriers so as to maximize the total throughput in all the sub-carriers. A goal is to perform a gradient ascent along the throughput curve by varying the sub-carrier power, resulting in alternations of the instantaneous received SNR of the sub-carriers. Stated another way, the embodiments of this invention perform adaptive power control subject to a total amount of available power.

Discussing the preferred embodiments of this invention now in greater detail, it is noted that for a coded OFDM packet-based system, it is extremely difficult to derive an analytical expression to relate the net data throughput to the sub-carrier SNR that, in turn, imposes a limitation on the deployment of analytical optimization techniques. Since the sub-channels always undergo flat fading, no matter whether the RF fading channel is multipath or is not multipath, each sub-carrier effectively experiences an additive white Gaussian noise (AWGN) channel with, generally, different power attenuation from sub-carrier to sub-carrier. If the data throughput (TP) is plotted versus the received SNR under AWGN (for example, as shown in FIG. 1 for a coded OFDM system), it may be seen that the throughput as a function of received SNR in dB resembles a sigmoid function of the following form, $$TP(x) = \frac{A}{1 + e^{-\lambda(x-\delta)}} \quad (1)$$

where x is the received SNR in dB, A is the asymptote of the function and $\lambda$ and $\delta$ are parameters to be determined to fit the sigmoid curve to the TP curve. The concept of using a sigmoid shape to the TP curve was originally proposed by Krishnaswamy for use in a network-assisted link adaptation scheme (D. Krishnaswamy, "Network-assisted link-adaptation with power control and channel re-assignment in wireless networks", 2002 International Conference on Third Generation Wireless and Beyond, San Francisco, Calif., USA, May 28-31, 2002, pp. 165-170).

The knee of sigmoid TP(x) is defined as the point of maximum curvature of TP(x), i.e. maximum of the curvature function $$C(x) = \left| \frac{TP''(x)}{(1 + (TP'(x))^2)^{3/2}} \right|$$

[Krishnaswamy]. As the sigmoid is symmetrical about $x=\delta$ there are two knees—the one with $x>\delta$ is known as the upper knee, another one with $x<\delta$ is known as the lower knee.

Using a least square fit method or otherwise one may find the parameters A, $\lambda$ and $\delta$, which completely characterize the sigmoid function, that fit the sigmoid function to the simulated (or experimentally generated) TP curve. For the normalized TP curve in FIG. 1 it was found that A=20, $\lambda=1.6817$ and $\delta=0.9697$ create a sigmoid curve closely resembles the simulated TP. The normalized TP chosen is (1-PER)*PPS, where PPS is packets-per-OFDM-symbol—total number of data packets transmitted in all the sub-carriers per OFDM symbol. Since the sub-channels are orthogonal to each other, and the channel distribution is identical across all the sub-channels (see R. van Nee and R. Prasad, "OFDM for Wireless Multimedia Communications", Artech House, Boston, January 2000), the TP curve has a similar sigmoid shape whether the throughput plotted is normalized per OFDM symbol or per sub-carrier.

With the TP function modeled by an analytically treatable sigmoid function, a gradient-based search method is employed in accordance with the preferred embodiments of this invention to vary the power of individual sub-carriers to maximize the TP. As viewed from the sigmoid curve shape, it can be appreciated that the sub-carriers with received SNR to the left of the lower knee of the curve should have their power reduced and allocated to those to the right of the lower knee, since these "bad" sub-carriers do not contribute much, if anything, to the total TP. On the other hand, the sub-carriers in the intermediate area between the upper and lower knees should have their power increased, within the power constraint, to beyond the upper knee region where the resultant TP is approximately the best achievable, without going too far past the upper knee. This is because any additional power allocated to these sub-carriers will result in diminishing throughput returns.

A presently preferred method for executing such a constrained optimization procedure involves the use of a backtracking gradient search scheme. Firstly, one may formulate the problem mathematically in standard form as, $$\text{minimize} - \sum_{k=0}^{N-1} TP_k \quad (2)$$

$$\text{subject to} \sum_{k=0}^{N-1} P_k - P_{total} \leq 0$$

$$\text{given} \quad A_k, \lambda_k, \delta_k \text{ for } k = 0, 1, \ldots, N-1$$

where N is the total number of sub-carriers, $P_k$ is the $k^{th}$ sub-carrier's power allocation for which one is solving, and $A_k$, $\lambda_k$, and $\delta_k$ are the sigmoid parameters for the $k^{th}$ sub-carrier's throughput defined as $$TP_k = \frac{A_k}{1 + e^{-\lambda_k(x_k - \delta_k)}} \text{ for } k = 0, 1, \ldots, N-1, \quad (3)$$

where $x_k$ is the $k^{th}$ sub-carrier's SNR in dB at the receiver defined as, $$x_k = 10 \log_{10}\left(\frac{P_k|H_k|^2}{N_o}\right), \quad (4)$$

where $H_k$ is the sub-channel frequency function and $N_o$ is the noise power (assumed to be the same in all sub-carriers). Define $P_{total}$ as the total power available per OFDM symbol where, $$P_{total} = \sum_{k=0}^{N-1} P_k \quad (5)$$

and $TP_{total}$ as the total throughput (assuming a single channel realization that is desired to be maximized) as, $$TP_{total} = \sum_{k=0}^{N-1} TP_k \quad (6)$$

This problem definition and its solution allow for the same, and different, modulation and coding schemes on different sub-carriers, and thus for generalizing the problem for multiple possible scenarios. The initial embodiment described herein assumes a case where all sub-carriers carry the same modulation and coding scheme (i.e. no adaptive bit loading and all sub-carriers use the same modulation and coding scheme). In further embodiments described herein multiple modulation and coding schemes are deployed among sub-carriers, with the result that different sub-carriers can have different sigmoid parameters.

The gradient of the TP function with respect to the transmitted power vector $P^{(n)}$ (the superscript (n) here represents the $n^{th}$ iteration of the search) may be written as, $$\nabla f(P^{(n)}) = \left[ \frac{\partial TP_0}{\partial P_0} \frac{\partial TP_1}{\partial P_1} \frac{\partial TP_2}{\partial P_2} \cdots \frac{\partial TP_{N-1}}{\partial P_{N-1}} \right]^T \bigg|_{P^{(n)}} \quad (7)$$

where each element is the partial derivative evaluated using the current sub-carrier power assignment from the vector, $$P^{(n)} = [P_0^{(n)} P_1^{(n)} \cdots P_{N-1}^{(n)}]^T \quad (8)$$

Now, one determines the direction vector by moving in the direction of $\nabla f(P^{(n)})$ while remaining within the power constraint. Letting $A = 1_{(1 \times N)}$, where $1_{(1 \times N)}$ is a vector of dimension $(1 \times N)$ consisting of all ones, then $$AA^T = 1_{(1 \times N)} 1_{(N \times 1)} = N \text{ and} \quad (9)$$

$$A^T A = 1_{(N \times 1)} 1_{(1 \times N)} = 1_{(N \times N)} \quad (10)$$

Projecting the gradient onto the null space of A yields the direction vector for the $n^{th}$ iteration, $$\begin{aligned} g_n &= \left[ I_{(N \times N)} - A^T (AA^T)^{-1} A \right] \nabla f(P^{(n)}) \quad (11) \\ &= \left[ I_{(N \times N)} - A^T (N)^{-1} A \right] \nabla f(P^{(n)}) \\ &= \left[ I_{(N \times N)} - \frac{1}{N} A^T A \right] \nabla f(P^{(n)}) \\ &= \left[ I_{(N \times N)} - \frac{1}{N} 1_{(N \times N)} \right] \nabla f(P^{(n)}) \end{aligned}$$

where $I_{(N \times N)}$ is the identity matrix of dimension (N×N) (i.e., ones along the main diagonal matrix elements and zeros on all other matrix elements). The update equation for power allocation is thus $$P^{(n+1)} = P^{(n)} + \alpha_n \frac{g_n}{\sqrt{g_n^T g_n}}, \quad (12)$$

where $\alpha_n$ is the step size on the $n^{th}$ iteration found through a backtracking line search (see S. Boyd and L. Vandenberghe, "Convex Optimization", Cambridge University Press, UK, 2004).

Backtracking line search is an effective inexact line search method. A preferred version of backtracking may be described as follows. For a line ascent search of a function $f$, given an ascent direction $v$ for $f$ at $x \in \mathrm{dom} f$, $t = 1;$ while $(f(x + tv) < f(x) + \alpha t \nabla f(x)^T v)$ $\quad t = \beta t;$ end;

where $\alpha$ and $\beta$ are two constants with $0 < \alpha < 0.5$, $0 < \beta < 1$. Hence the backtracking process starts with a unit step size t and then reduces it by the factor $\beta$ until the stopping condition $f(x+tv) \geq f(x) + \alpha t \nabla f(x)^T v$ holds. Further details of backtracking and how to choose the values of $\alpha$ and $\beta$ can be found in the book by Boyd and Vandenberghe [6].

Initially all sub-carriers are allocated with equal and uniform power. Note that $$\frac{g_n}{\sqrt{g_n^T g_n}}$$

is a unity directional vector, and any scaling factor in $\nabla f(P^{(n)})$ is canceled out. Using the logarithm conversion from log-base-e to log-base-10, $\log_{10}(a) = \ln(a) \log_{10}(e)$, one may write the received SNR in dB as $$\begin{aligned} x_k &= 10 \log_{10}\left( \frac{P_k |H_k|^2}{N_o} \right) \quad (13) \\ &= 10 \log_{10}(e) \ln\left( \frac{P_k |H_k|^2}{N_o} \right) \\ &= 10 \log_{10}(e) (\ln(P_k |H_k|^2) - \ln(N_o)) \\ &= K \ln(P_k |H_k|^2) - K \ln(N_o) \end{aligned}$$

where $K = 10 \log_{10}(e)$. Substituting the above in equation (1), for the $k^{th}$ sub-carrier, $$\begin{aligned} TP_k &= \frac{A_k}{1 + e^{-\lambda_k (x_k - \delta_k)}} \quad (14) \\ &= \frac{A_k}{1 + e^{-\lambda_k (K \ln(P_k |H_k|^2) - K \ln(N_o) - \delta_k)}} \\ &= \frac{A_k}{1 + e^{\lambda_k K \ln(N_o) + \lambda_k \delta_k} e^{-\lambda_k K \ln(P_k |H_k|^2)}} \end{aligned}$$

Taking the partial derivative of $TP_k$ with respect to $P_k$, $$\frac{\partial TP_k}{\partial P_k} = -A \left( 1 + e^{\lambda_k \delta_k + \lambda_k K \ln(N_o)} e^{-\lambda_k K \ln(P_k |H_k|^2)} \right)^{-2} \quad (15)$$

$$e^{\lambda_k \delta_k + \lambda_k K \ln N_o} \frac{\partial}{\partial P_k} e^{-\lambda_k K \ln(P_k |H_k|^2)}$$

-continued since (16)

$$\frac{d}{dx}\ln u = \frac{1}{u}\frac{du}{dx} \Rightarrow \frac{d}{dx}\ln x = \frac{1}{x},$$

so $$\frac{\partial}{\partial P_k}e^{-\lambda_k K\ln(P_k|H_k|^2)} = e^{-\lambda_k K\ln(P_k|H_k|^2)}$$

$$\frac{\partial}{\partial P_k}(-\lambda_k K\ln P_k - \lambda_k K\ln|H_k|^2)$$

$$= e^{-\lambda_k K\ln(P_k|H_k|^2)}(-\lambda_k K)\frac{1}{P_k}$$

and hence, (17)

$$\frac{\partial TP_k}{\partial P_k} = \frac{A_k\lambda_k K}{P_k}\left(1 + e^{\lambda_k \delta_k + \lambda_k K\ln(N_o)}e^{-\lambda_k K\ln(P_k|H_k|^2)}\right)^{-2}$$

$$e^{\lambda_k \delta_k + \lambda_k K\ln(N_o)}e^{-\lambda_k K\ln(P_k|H_k|^2)}$$

$$= \frac{A_k\lambda_k K}{P_k}\left(1 + e^{\lambda_k \delta_k + \lambda_k K\ln(N_o/(P_k|H_k|^2))}\right)^{-2}$$

$$e^{\lambda_k \delta_k + \lambda_k K\ln(N_o/(P_k|H_k|^2))}$$

By substituting back into equation (17), the received SNR in dB expression (13), one may simply write, $$\frac{\partial TP_k}{\partial P_k} = \frac{A_k\lambda_k K}{P_k}(1 + e^{-\lambda_k(x_k-\delta_k)})^{-2}e^{-\lambda_k(x_k-\delta_k)} \quad (18)$$

This is the expression to be used in equations (7), (11) and (12) for updating the power vector $P^{(n)}$ in the $n^{th}$ iteration of the gradient search. The sub-channel frequency function $|H^k|^2$ and noise power $N_o$ are assumed to be known. Initially, all sub-carriers are set to the same power, equations (18), (7), (11) and (12) update the power vector with the step size $\alpha_n$ in (12) obtained by the backtracking process. A single execution of this set of equations forms a search iteration of the gradient ascent process towards the extremum of the multi-dimensional TP function across all sub-carriers. The search iteration is repeated, updating the power vector $P^{(n)}$ each time until no further improvement in $TP_{total}$ obtained, or a fixed number of iterations are exceeded. These termination criteria ensure that there is no time convergence issue, i.e., every time the algorithm is invoked the power vector $P^{(n)}$ is adjusted to the best value, pertaining to the current channel SNR, within a predefined number of iterations.

What this gradient ascent algorithm does is to decrease or remove power from the sub-carriers in bad conditions (i.e., a relatively low received SNR) and allocates power to sub-carriers in good conditions (i.e., a relatively high received SNR). At each search iteration the power of the bad sub-carriers is gradually reduced, thus shifting their SNR values to the left side of the TP curve. Conversely, the power of the good sub-carriers is increased, thus shifting their received SNR values further to the right side of the TP curve. After the search is terminated the received SNR values of the sub-carriers will be found to be either below the lower knee of the sigmoid function shown in FIG. 1, or around or beyond the upper knee of the sigmoid function. Note that equation (11) ensures that a power constraint is imposed, and that the sum of the power of all the sub-carriers remains the same.

Figure 2:
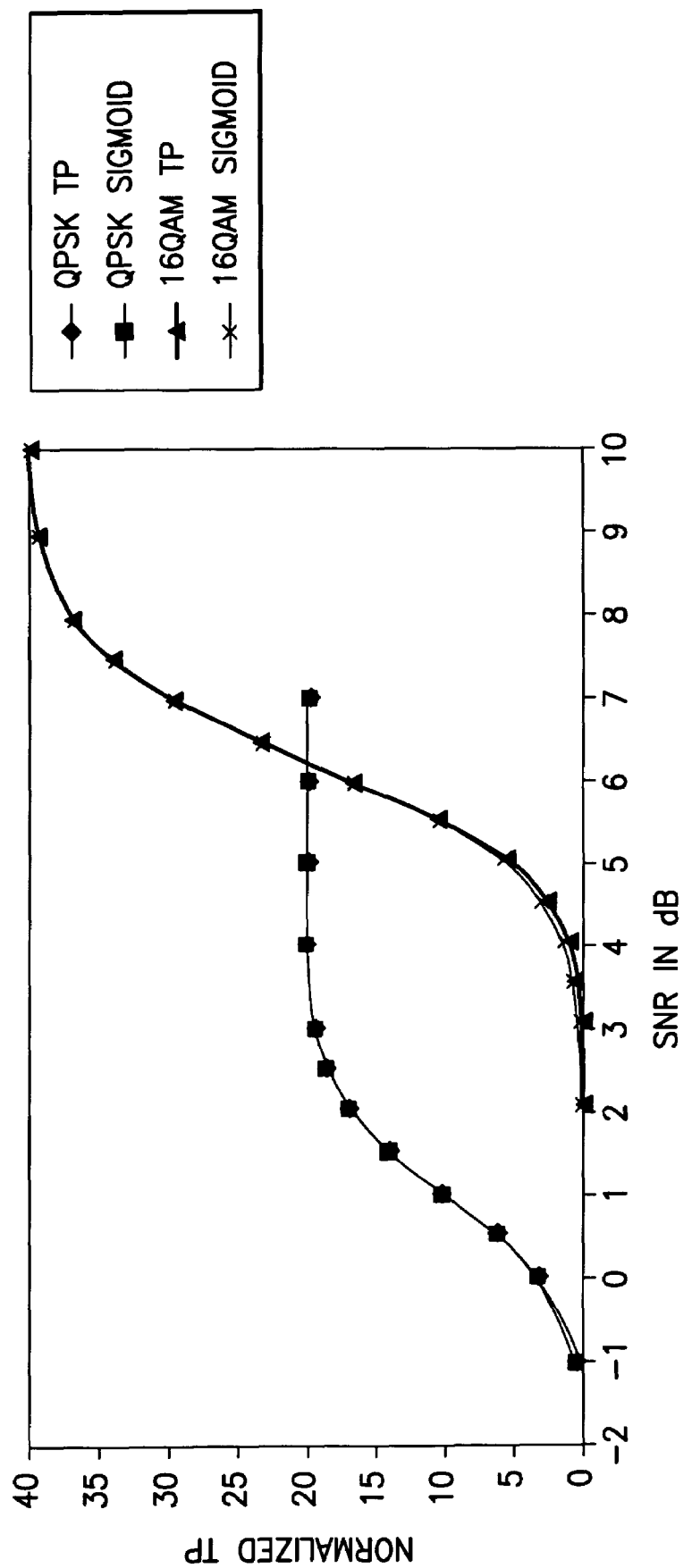
FIG. 2 shows modeling of a throughput curve by sigmoid functions where multiple modulation and coding schemes are permitted.

Equations (18), (7), (11) and (12) may be used straightforwardly as described above to update the power vector $P^{(n)}$ when the sigmoid parameters $A_k$, $\lambda_k$, and $\delta_k$ are homogeneous across sub-carriers (i.e. all sub-carriers employ the same modulation and coding scheme (MCS)). When $A_k$, $\lambda_k$, and $\delta^k$ are allowed to be heterogeneous across sub-carriers (i.e. different MCSs are allowed in the sub-carriers), suitable sigmoid parameters have to be assigned to each of the sub-carriers during the gradient search iterations. In other words one needs to determine the MCS of, or the number of bits to be loaded into, each sub-carrier if multiple MCSs are allowed. One solution is to use the cross-over point between different sigmoid curves as a switching point. For example, consider a simple case of two available MCSs. FIG. 2 shows the two sigmoid throughput curves, one for coded QPSK and one for coded 16QAM. It is clear that the two curves have different sigmoid parameters A, λ and δ. The cross-over point is seen to be about 6 dB which indicates that a better TP would be obtained by switching over from QPSK to 16QAM when the SNR is beyond that point and vice versa. Therefore to determine the MCS (i.e. the sigmoid parameters) one may monitor each sub-carrier's SNR in each search iteration, if it is below the cross-over point sigmoid parameters for the QPSK curve are assigned, otherwise that for 16QAM are allocated, therby allows $A_k$, $\lambda_k$, and $\delta_k$ to vary in each sub-carrier and between search iterations. This idea may be extended to the general case of multiple MCSs, using the cross-over point between adjacent sigmoid curves to determine the sigmoid parameters assignment. Furthermore, by varying the values of the cross-over points, the performance may also be fine-tuned.

After the gradient ascent search has terminated, some portion of the sub-carriers will have a very low effective SNR, and thus their associated throughputs are very small. A low SNR (i.e., small $x_k$) implies that the data carried by these sub-carriers is most likely to be corrupted. Therefore, it may be preferred to disable these sub-carriers and re-allocate their power to the remainder of the sub-carriers. This may be viewed as an optional enhancement to the aforementioned gradient ascent search, and may be referred to for convenience as a gradient ascent search with sub-carrier disabling. In this enhanced gradient ascent search the sub-carrier power is first optimized by the gradient ascent search, then the received SNR of the sub-carriers are examined one by one, and those with a SNR value below a certain threshold (e.g., at about the lower knee of the sigmoid function) are labeled as bad sub-carriers to be disabled. The next steps involve removing the power from the disabled sub-carriers and allocating this removed power to the other sub-carriers, and re-executing the gradient ascent search to determine the new power distribution within the subset of good sub-carriers only. The latter process ensures that the power across the subset of good sub-carriers is optimized, i.e., the power recovered from the bad sub-carriers is not simply evenly re-distributed over the good sub-carriers.

Figure 3:
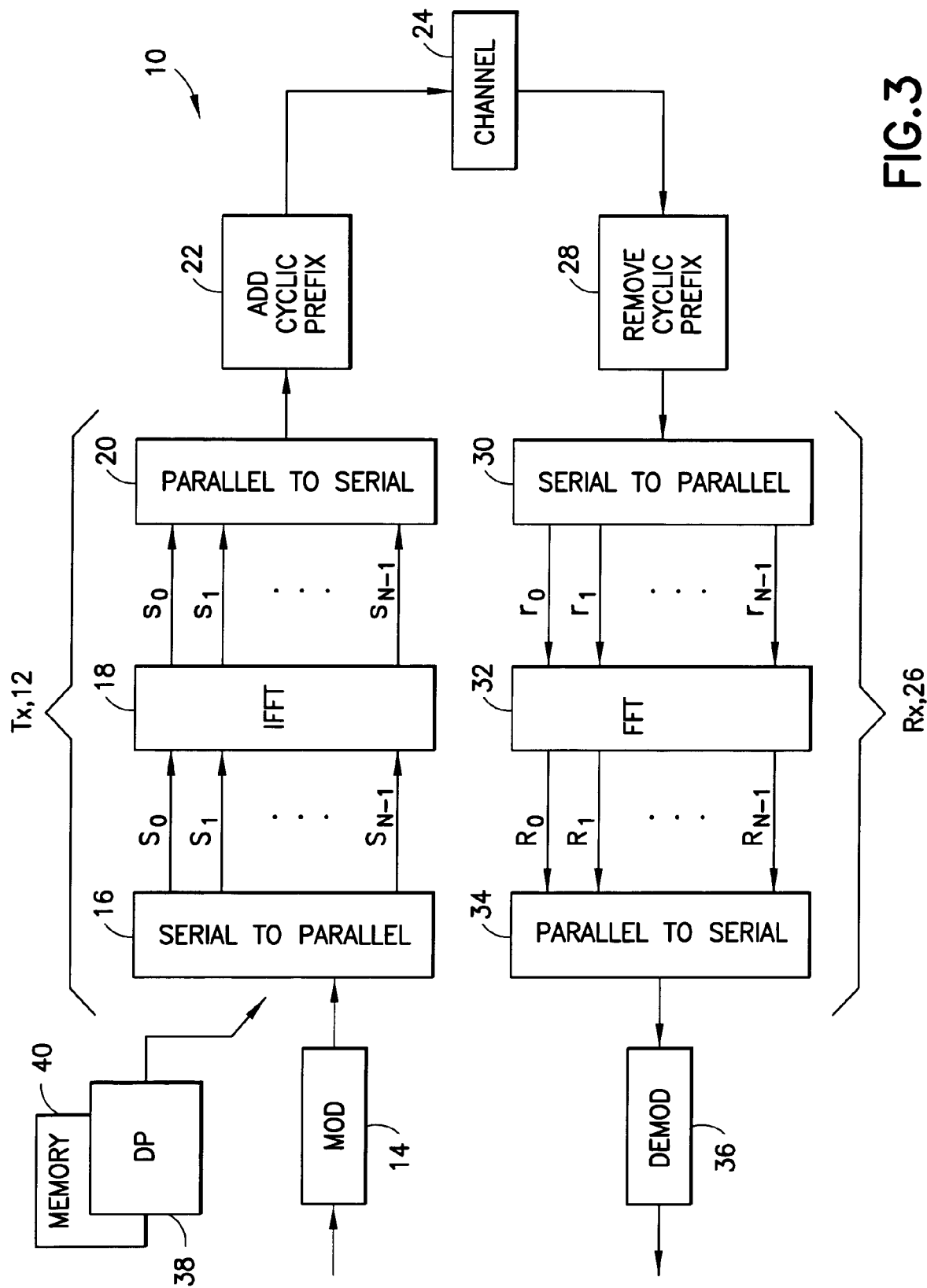
FIG. 3 is a block diagram of an N sub-carrier OFDM modem that is suitable for use in implementing the preferred embodiments of this invention.

A block diagram of an N sub-carrier OFDM modem 10 is shown in FIG. 3. At the transmitter 12, a modulator 14 sends N complex symbols $S_n$, $0 \leq n \leq N-1$, that are multiplexed to the N sub-carriers by serial to parallel block 16. An Inverse-Fast-Fourier-Transform (IFFT) block 18 translates the N frequency-domain symbols into N time-domain samples $s_n$, $0 \leq n \leq N-1$, which are serialized in block 20 and to which M cyclic prefix samples are inserted in block 22 before they are transmitted over the time-varying and noise-corrupted channel 24 to a receiver 26. An OFDM symbol thus consists of N symbols in the frequency-domain, or N+M samples in the time-domain. At the receiver 26 the cyclic prefix is stripped from the received time-domain samples by block 28, the serial stream in converted to parallel in block 30, and the remaining data samples $r_n$, $0 \leq n \leq N-1$, are transformed using Fast-Fourier-Transform (FFT) block 32 to yield the received frequency-domain data symbols $R_n$, $0 \leq n \leq N-1$. The received frequency-domain data symbols are serialized in block 34 and applied to a demodulator 36.

Note that there is preferably also a data processor (DP) 38, such as a microprocessor, that is coupled to a computer readable data storage medium, such as a memory 40, wherein are stored computer program instructions at least some of which are used by the data processor 38 to execute operations in accordance with the embodiments of this invention.

The impulse response of the channel 24 is assumed to be constant for the duration of an OFDM symbol, therefore it can be characterized during such a period by the N-point Fourier Transform of the impulse response, which is referred to as the frequency-domain channel transfer function (or simply as the channel frequency function) $H_n$. For each sub-carrier n, the received complex data symbols can be expressed as, $$R_n = S_n \cdot H^n + \eta_n \qquad (19)$$

where $\eta_n$ is an AWGN sample.

Figure 4A:
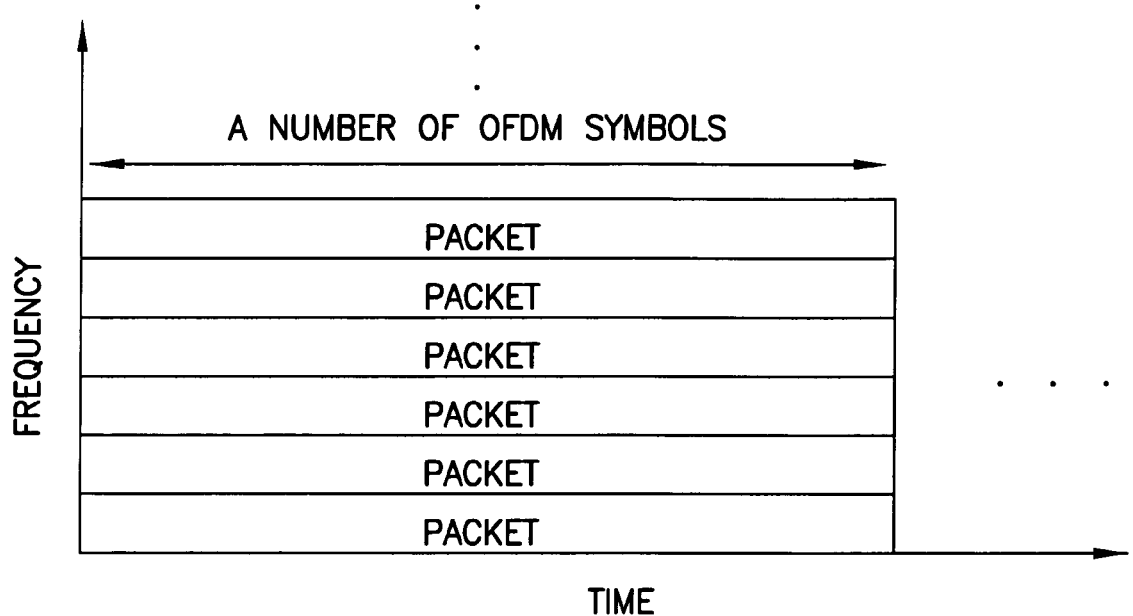
FIG. 4a illustrates time-domain mode of packet loading, where each sub-carrier is loaded with its own packet and each packet spreads across a number of OFDM symbols.

For a packet-data based OFDM transceiver, there are various ways of configuring the sub-carriers to carry the data packets. One technique is to load individual sub-carriers with symbols from separate packets and spread the packets across the time domain, i.e., each sub-carrier is dedicated to carry its own packet. For an OFDM modem 10 with N sub-carriers, symbols from the N packets are thus transmitted simultaneously in a single OFDM symbol. A number of OFDM symbols are required to transmit a full packet in each sub-carrier, referred to herein as a frame. If the fade rate is low, or the OFDM symbol duration is short, the channel 24 may be assumed to remain constant for the entire packet or frame. FIG. 4a illustrates this mode of spreading the packets over time.

Figure 4B:
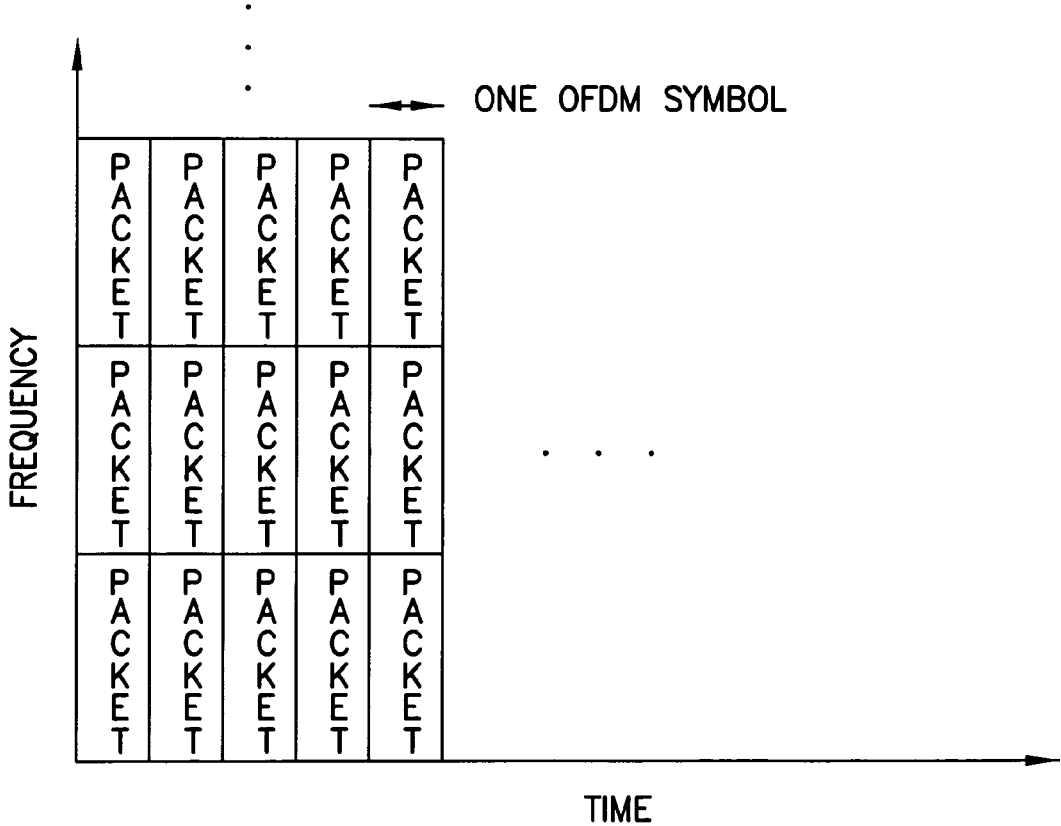
FIG. 4b illustrates frequency-domain mode of packet loading, where a plurality of packets are spread across the sub-carriers in an OFDM symbol.

Another method of loading up the sub-carriers with data packets is to distribute the packets across the sub-carriers. The size of a packet is assumed to be small relative to the number of sub-carriers, so that a plurality of packets may be fit in a single OFDM symbol. Transmission of a single OFDM symbol thus results in several complete packets to be sent at the same time. Interleaving should be applied across all of the data symbols conveyed by the OFDM symbol (i.e. across all of the sub-carriers) to ensure the packets share similar error probabilities thus effectively creating a homogenous channel from the perspective of the bit stream. FIG. 4b shows this frequency-domain spread mode of spreading the packets over frequency.

Although the following description of the gradient ascent search method refers to both methods for sub-carrier packet loading, the gradient ascent search method of the present invention is not limited to the described methods of sub-carrier packet loading, and can be implemented advantageously in systems employing different methods of sub-carrier packet loading.

For the time-domain mode of sub-carrier packet loading under slow fading, it is adequate to perform the power allocation once every OFDM packet, preferably at the beginning of the packet. The same power allocation is maintained in every sub-carrier for the entire packet that spreads across a frame of OFDM symbols.

For the frequency-domain mode of sub-carrier loading the power assignment may be performed once per OFDM symbol. At every OFDM symbol the sub-channel conditions are examined and power assignment updated. However, for slow fading channels it is adequate to adapt the power at regular intervals and keep the power assignment unchanged between the intervals.

Figure 14:
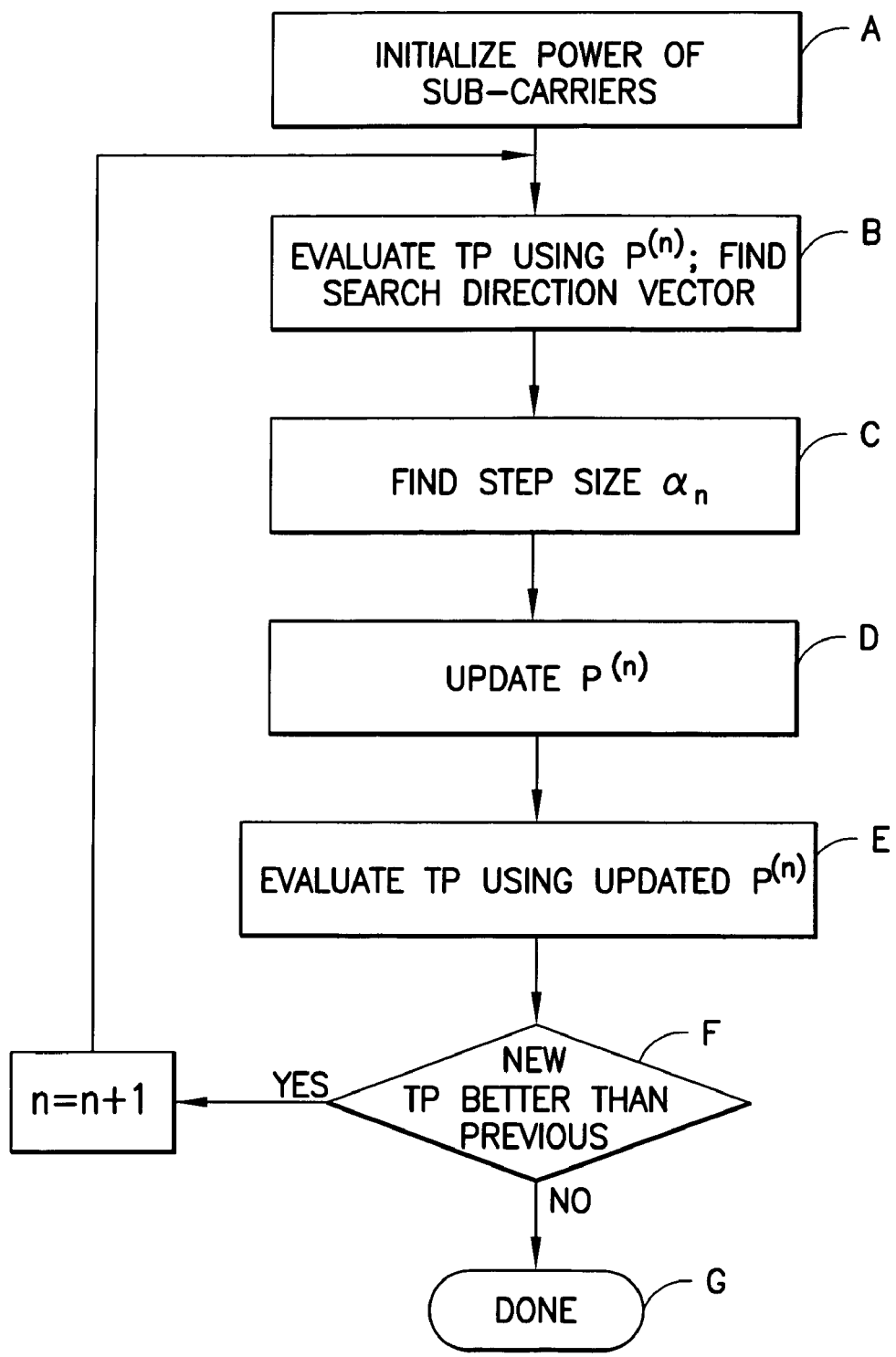
FIG. 14 is a logic flow diagram that illustrating a gradient ascent search method, without sub-carrier disabling.

For the case of the gradient ascent search with no sub-carrier disabling, the sub-carrier power optimization process uses a single gradient ascent search. All of the sub-carriers are loaded with data with the resultant power allocation, and no sub-carriers are disabled. Further, a feedback channel is needed to convey the channel information to the transmitter. In alternative embodiments the gradient search algorithm may be implemented at the receiver, but a feedback channel is still needed to feedback the power and sigmoid parameters vectors. Referring as well to FIG. 14, for time-domain mode of packet loading the following steps are carried out at the beginning of packet or frame; for the frequency-domain mode they are performed either before sending each OFDM symbol, or before sending a plurality of OFDM symbols.

At Block A, the power of all sub-carriers are initialized to be the same, i.e., all elements of $P^{(n)}$ are set to have the same value $P_k = P_{total}/N$ for k=0, 1, ..., N−1.

At Block B, and assuming that the frequency functions and system noise power of the sub-channels are known, equations (18), (7), (11) and (12) are used to find the search direction vector $g_n$. Also, by means of equations (3), (4) and (6) the resultant total TP is evaluated with the current value of $P^{(n)}$.

At Block C, a backtracking algorithm, such as the one described by in Boyd and Vandenberghe, is employed to find the step size $\alpha_n$.

At Block D, equation (12) is used to update the power vector $P^{(n)}$.

At Block E, and using equations (3), (4) and (6), the total TP is evaluated with the updated $P^{(n)}$.

At Block F, if the new TP value is better than the previous one, an iteration of the gradient ascent search is completed. The method then increments n (i.e. n=n+1), and returns to Block B to perform another iteration. However, if the new TP offers no improvement relative to the previous TP, or if some certain number of gradient ascend iterations have been completed, the method terminates at Block G.

After termination, the extremum of the multi-dimensional TP curve or its vicinity should have been reached, and $P^{(n)}$ is the final power vector that dictates the power in the sub-carriers. For time-domain mode of packet loading each of the sub-carriers is loaded up with data symbol from its own packet, forming an OFDM symbol, which is then transmitted in a conventional manner. The power vector $P^{(n)}$ is maintained unchanged throughout the entire packet. Upon completion of the frame of OFDM symbols, the gradient ascent search is repeated from Block A for the next set of packets. For frequency-domain mode of packet loading a plurality of data packets are spread across the sub-carriers. The gradient ascent search is repeated from Block A for the next OFDM symbol.

Figure 15:
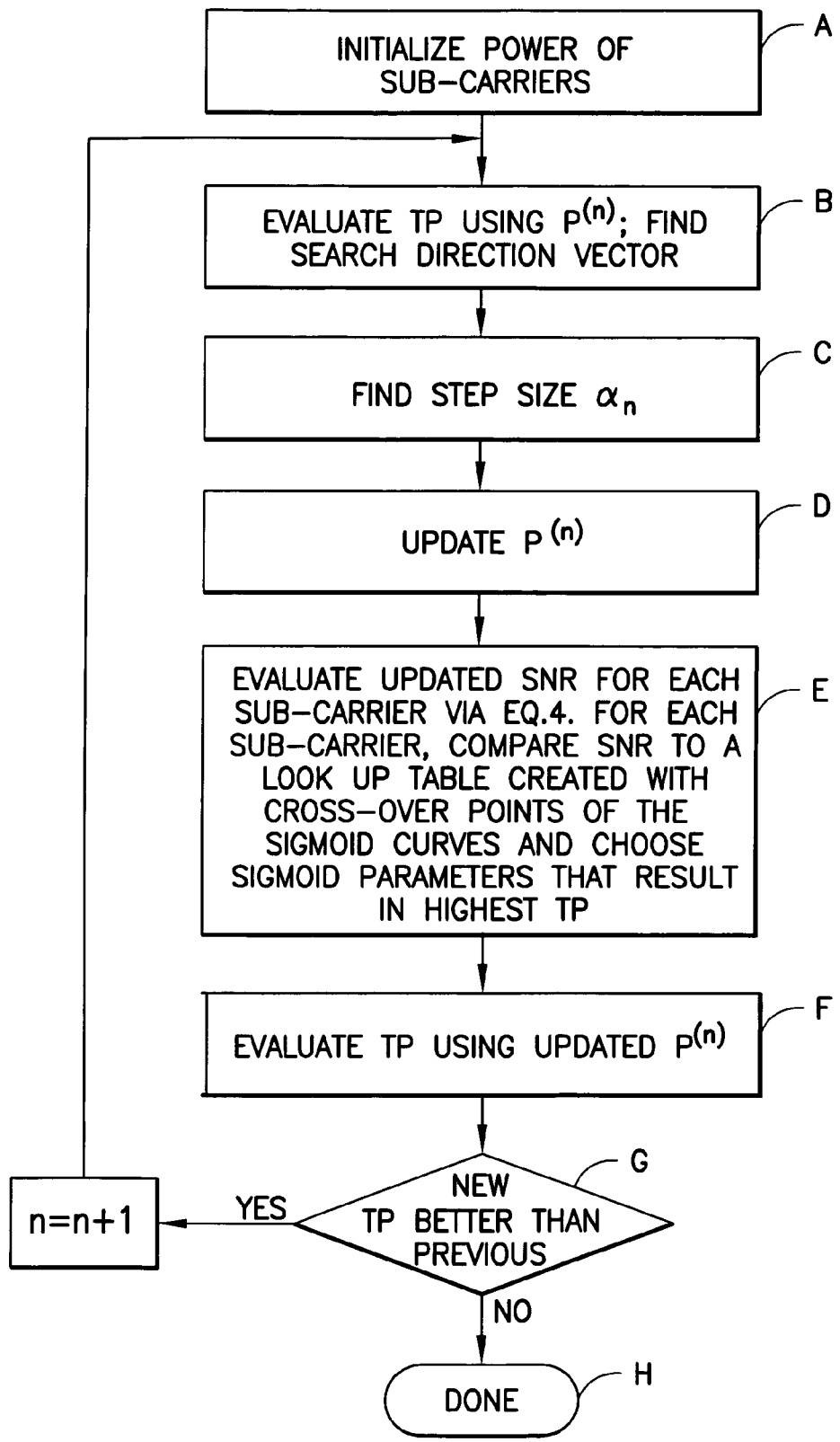
FIG. 15 is a logic flow diagram illustrating a gradient ascent search method, without sub-carrier disabling but where different modulation and coding schemes are allowed in different sub-carriers.

For the case of gradient search without sub-carrier disabling but where different modulation and coding schemes (MCS) are allowed in different sub-carriers the method, as depicted in FIG. 15, proceeds in a similar manner as the method depicted in FIG. 14 up to Block E.

At Block E, if heterogeneous sigmoid parameters are used across the sub-carriers (i.e. different MCSs are allowed in different sub-carriers), the updated SNR is evaluated for each sub-carrier via equation (4). For each sub-carrier, its SNR is compared to a look-up table created with the cross-over points of the sigmoid curves and the appropriate sigmoid parameters that result in the highest TP are chosen. After block E, the method depicted in FIG. 15 continues in a similar fashion to that depicted in FIG. 14.

Figure 16:
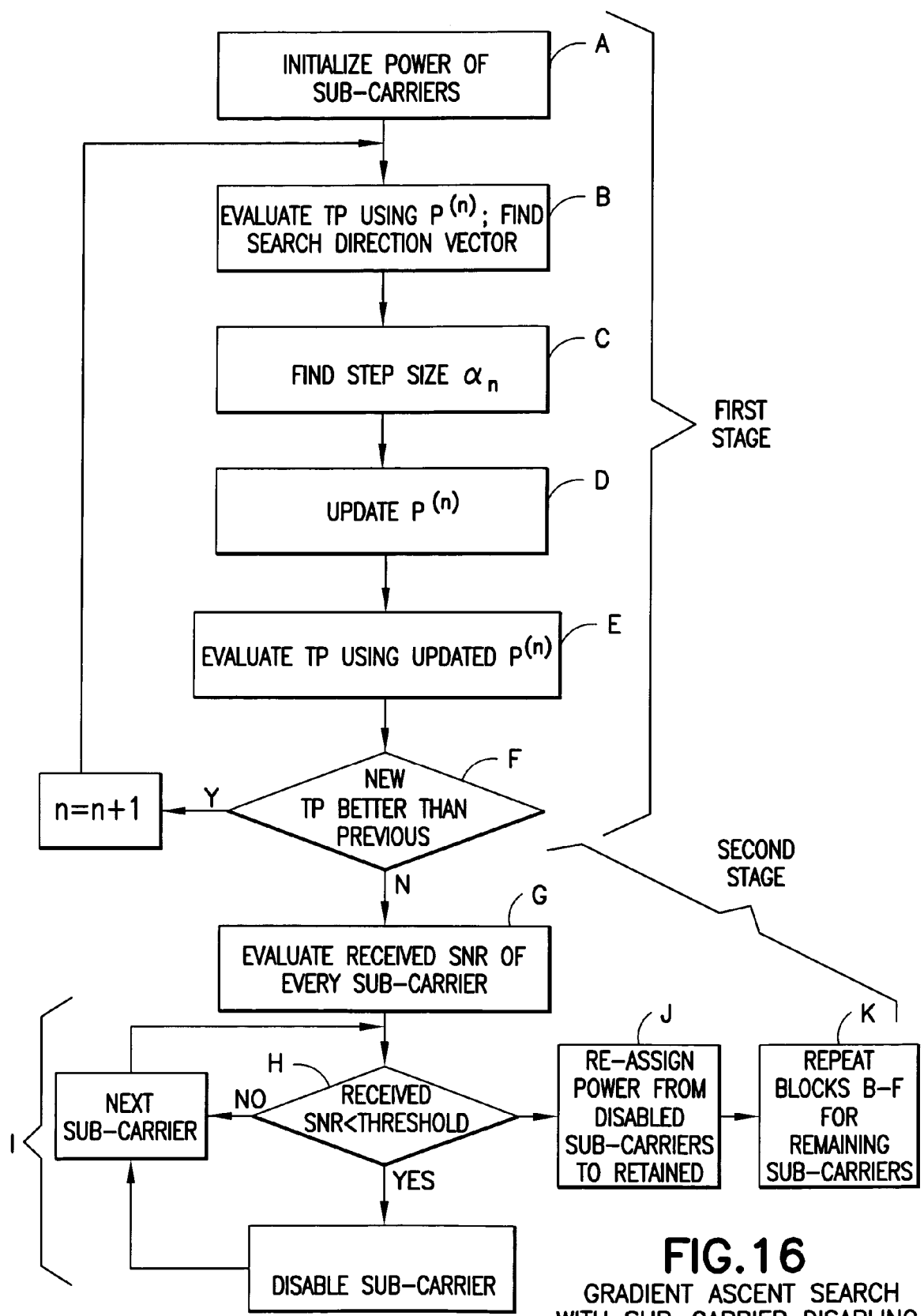
FIG. 16 is a logic flow diagram illustrating a gradient ascent search method, with sub-carrier disabling.

For the case of the gradient ascent search with sub-carrier disabling, the sub-carrier power optimization process is implemented as a two-stage gradient ascent search. The first stage is performed in the same way as described above and shown in FIG. 14 for the case where there is no sub-carrier disabling. However, in this embodiment the sub-carriers with a resultant SNR lower than a certain threshold are identified and disabled, and their power is allocated to the remaining good sub-carriers. A second search stage then determines how the total power available is distributed among the good sub-carriers. Referring to FIG. 16, the following steps are carried out at the beginning of packet or frame, where Blocks A through G are preferably the same as in FIG. 14 except that instead of terminating the method at Block G, the second search stage is initiated at Block H, where the received SNR of every sub-carrier resultant from $P^{(n)}$ is evaluated.

At Block I, if the received SNR is less than a pre-defined threshold, that sub-carrier is identified as a bad sub-carrier to be disabled.

At Block J, the method counts the number of disabled sub-carriers and re-assigns their power to the remaining good sub-carriers. For example, if the total power available is $P_{total}$ and there are m disabled sub-carriers, $P_{total}$ is (initially) evenly distributed to the remaining (N–m) sub-carriers, ignoring the power allocations from the first stage search.

At Block K, Blocks B through G are repeated, forming the second stage gradient ascent search for the remaining (N–m) sub-carriers.

In this embodiment the goal of the first stage search is simply to identify those bad sub-carriers to be disabled, while the actual power allocation is performed in the second stage. After Block K the extremum of the multi-dimensional TP curve or its vicinity should have been reached, and $P^{(n)}$ is the final power vector that dictates the power in the good sub-carriers. For time-domain mode of packet loading, each of the good sub-carriers is loaded up with data symbols from its own packet, forming an OFDM symbol, which is then transmitted to the channel 24. The power vector $P^{(n)}$ is kept unchanged throughout the entire packet or frame. Upon completion of the frame of OFDM symbols, the two-stage gradient ascent search is repeated from Block A for the next set of packets. For frequency-domain mode of packet loading a plurality of data packets are spread across the sub-carriers. The gradient ascent search is repeated from Block A for the next OFDM symbol.

In another embodiment the first stage search is applied to identify those bad sub-carriers to be disabled, as described above, but the second stage search is not performed. Instead, the total power recovered from the disabled sub-carriers is re-distributed (evenly or otherwise) to the good sub-carriers by adding the recovered power on top of their original power allocation resultant from the first stage search. This reduces the computation effort at the expense of a somewhat sub-optimal performance.

Figure 17:
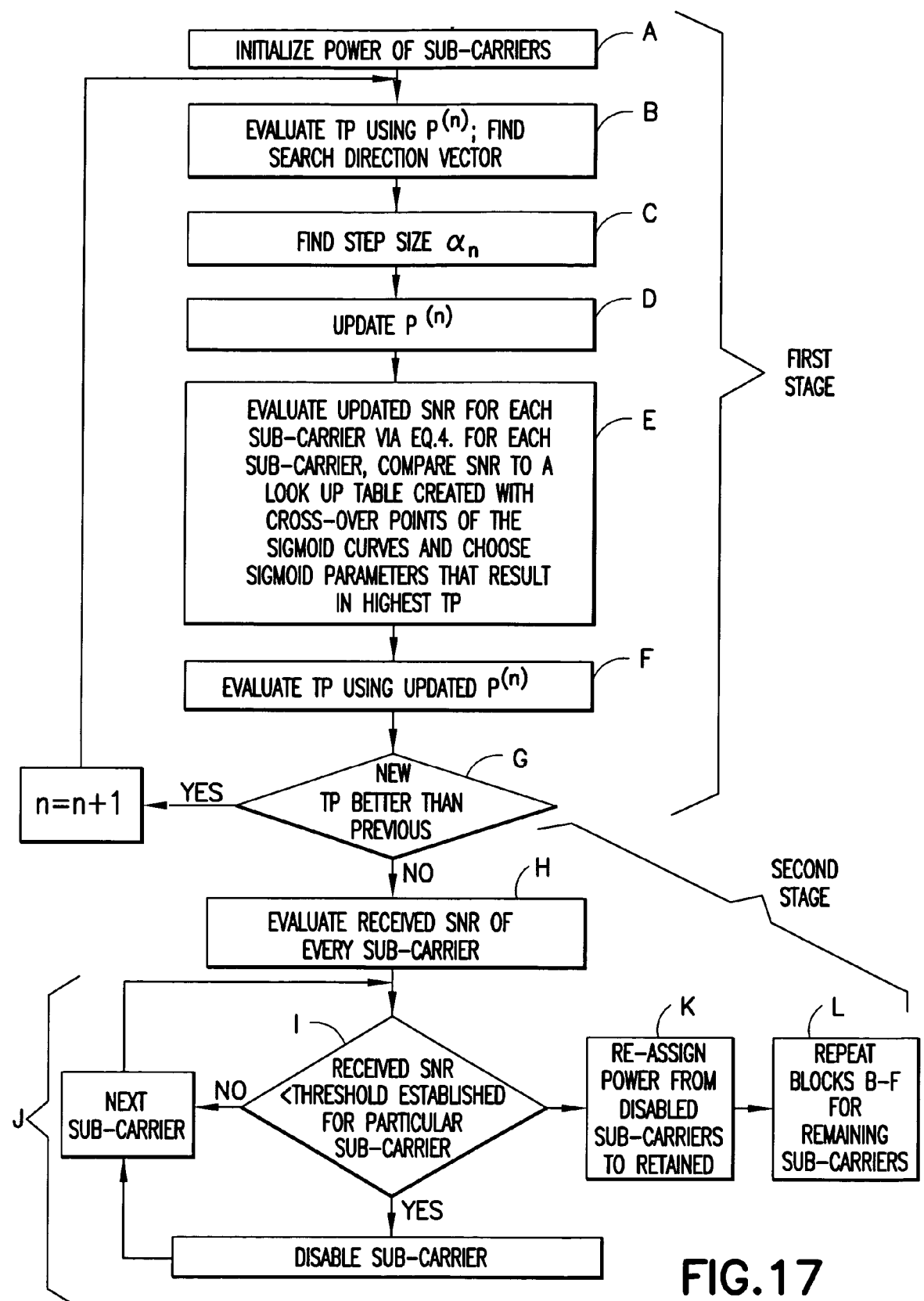
FIG. 17 is a logic flow diagram that illustrating a gradient ascent search method, with sub-carrier disabling and where different modulation and coding schemes are allowed in different sub-carriers.

For the case of gradient ascent search with sub-carrier disabling, and where different modulation and coding schemes (MCS) are allowed in different sub-carriers, the method proceeds as depicted in FIG. 17. The method depicted in FIG. 17 comprises at least two stages as in the case of the method described with respect to FIG. 16. In the case of the first stage, the method is similar to that depicted in FIG. 15, differing from the method depicted in FIG. 14 at Block E. At Block E, since heterogenous sigmoid parameters are allowed across the sub-carriers (i.e. different MCSs are allowed in different sub-carriers), it is necessary to evaluate the updated SNR for each sub-carrier via equation (4). For each sub-carrier, its SNR is compared to a look-up table created with the cross-over points of the sigmoid curves and the appropriate sigmoid parameters that result in the highest TP are chosen.

The second stage of the method depicted in FIG. 17 also differs from that depicted in FIG. 16 at Block J (corresponding to Block I of FIG. 16). At Block J, if the received SNR is lower than a pre-defined threshold, that sub-carrier is identified as a bad sub-carrier to be disabled. If heterogeneous sigmoid parameters across sub-carriers are allowed the pre-defined threshold value may also be different across sub-carriers. This is because different sigmoid curves have different lower knee regions and hence the disabling SNR threshold varies from one sigmoid curve to another.

With regard now to a simulation scenario, it is first noted that the gradient ascent search method aims to allocate power to the sub-carriers to maximize the total TP in an OFDM symbol, subject to a power constraint. As a non-limiting example, assume the use of identical modulation and an identical coding scheme for all the sub-carriers, and then vary the power across the data-bearing sub-carriers according to the constrained gradient ascent search in accordance with this invention. The time-domain mode of packet loading is chosen in the simulation for illustrative purpose. Assume that there are 2048 sub-carriers within an OFDM symbol giving 2048 time samples, to which 202 cyclic prefix samples are added. A time-domain OFDM symbol thus contains a total of 2250 data samples. The sampling frequency is chosen to be 100 MHz, a sub-carrier has a 48.828 KHz bandwidth, and an OFDM symbol occupies 22.5 microseconds. The channel coder is assumed to be a 1/2 rate convolution encoder from the IEEE 802.1 a standard (IEEE 802.1 a Standard, "Part 11: Wireless LAN MAC and PHY specifications: High Speed Physical Layer in the 5 GHz Band", September 1999). Either QPSK or 16QAM with coherent demodulation may be selected as the modulation scheme in all the sub-carriers. A packet of data contains 96 data bits (including CRC) and six flush bits, thus a packet of encoded symbols consists of 204 real symbols or 102 complex symbols. For the time-domain mode of packet loading an encoded packet lasts for 102 OFDM symbols if QPSK is used (or 51 OFDM symbols if 16QAM is employed). A frame is defined to contain 102 OFDM symbols for QPSK (or 51 OFDM symbols for 16QAM), during which time one packet is assumed to be transmitted by each sub-carrier. A normalized throughput TP defined as (1-PER)*PPS is used, where PPS is the total number of packets transmitted per OFDM symbol. For fixed QPSK and 16QAM modulation (and with no sub-carriers disabled) PPS is always 20 and 40 respectively, while with sub-carrier disabling the PPS can be any value between 0 (no sub-carrier used) to 20 and 40 (all sub-carriers are used), respectively. The channel 24 is assumed to be a two-path Rayleigh fading channel with the second path located 0.2 microseconds behind the first path, at half the power. This creates a highly fluctuating frequency function across the 2048 sub-carriers. The Doppler frequency can be 20 Hz, thus the channel condition remains essentially the same over a frame of 102 (or 51) OFDM symbols.

Figure 5:
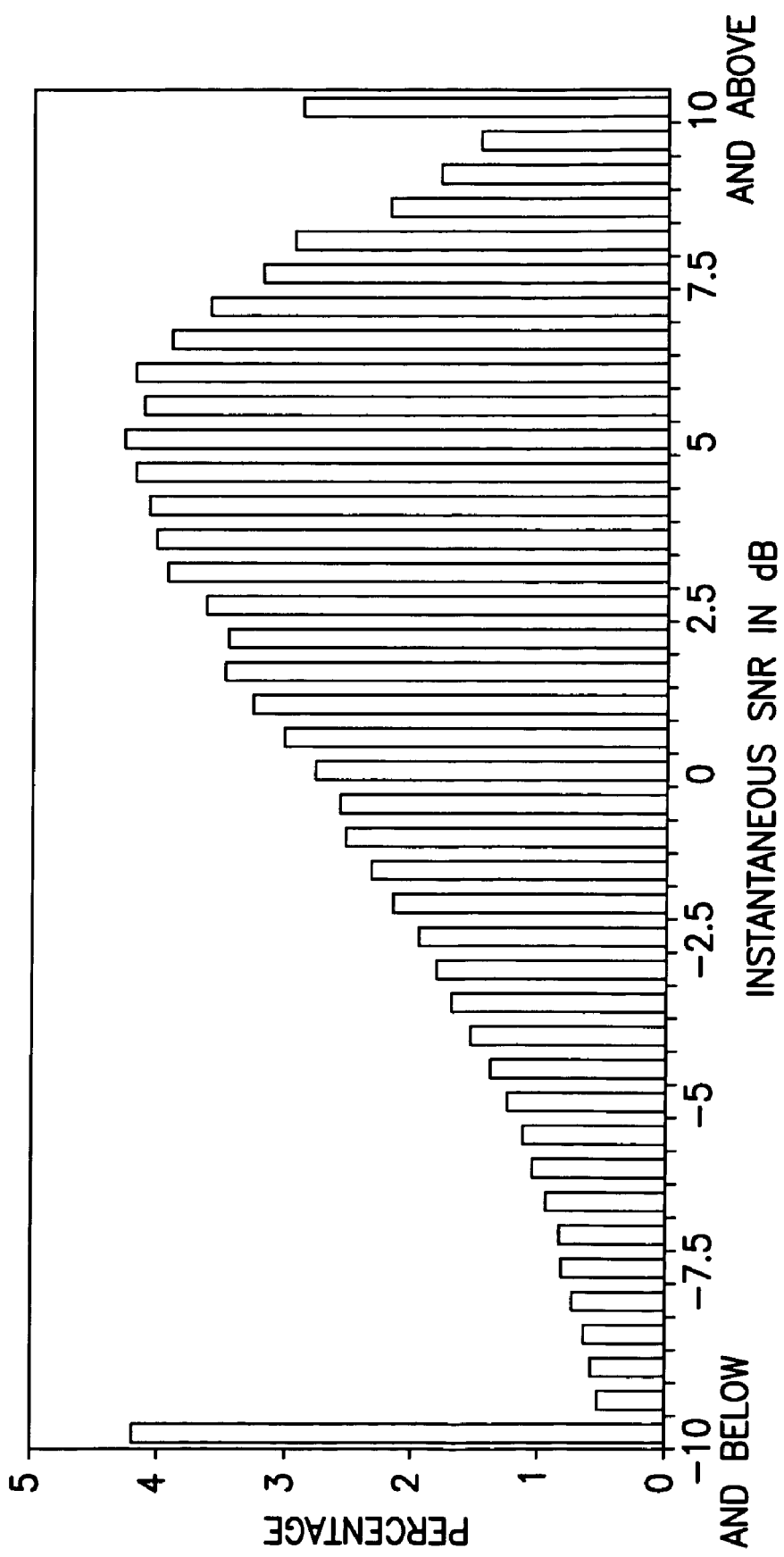
FIG. 5 shows a percentage distribution of instantaneous received sub-carrier SNR, before gradient ascent search.
Figure 6:
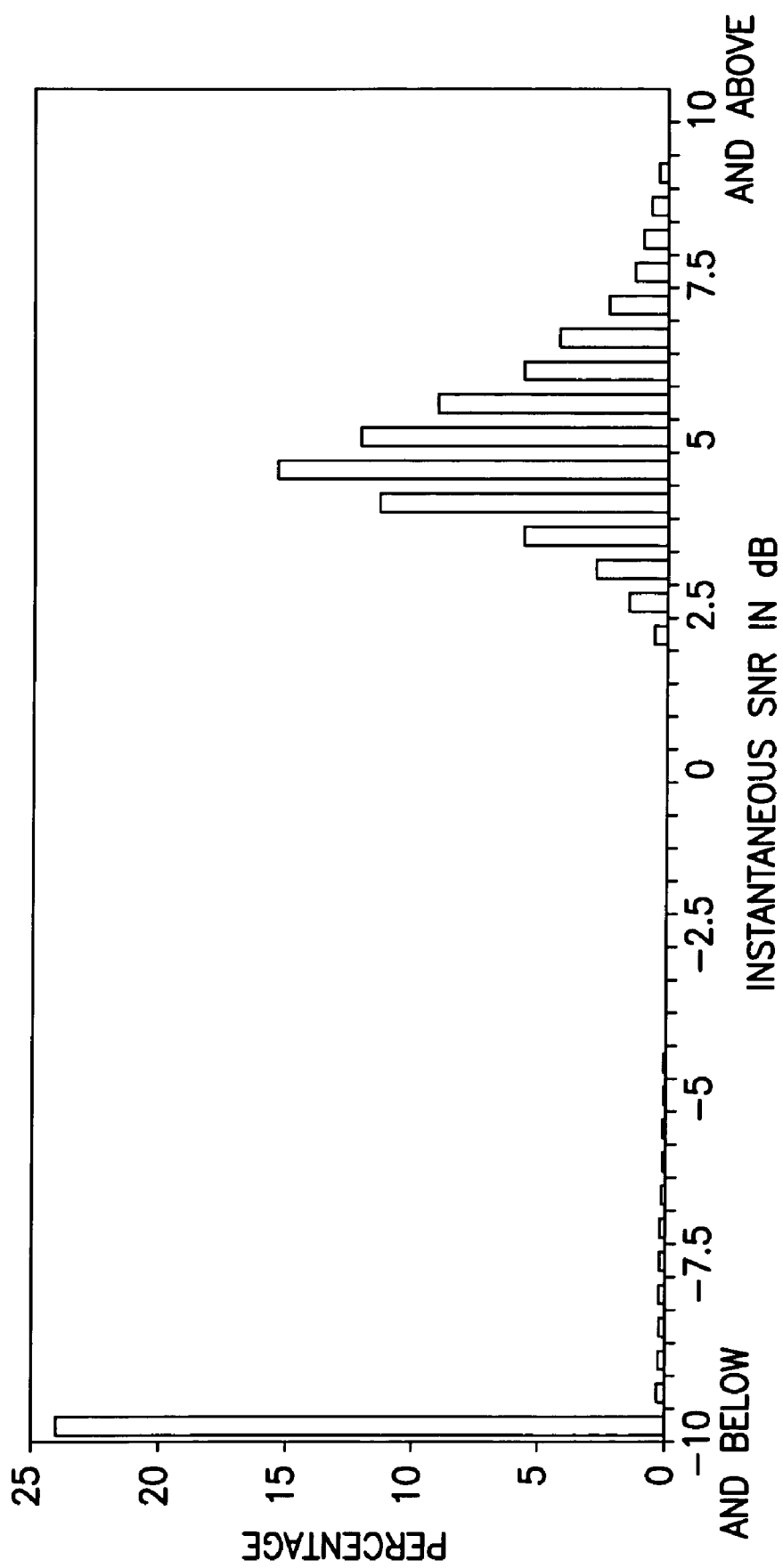
FIG. 6 shows a percentage distribution of instantaneous received sub-carrier SNR, after gradient ascent search.
Figure 7:
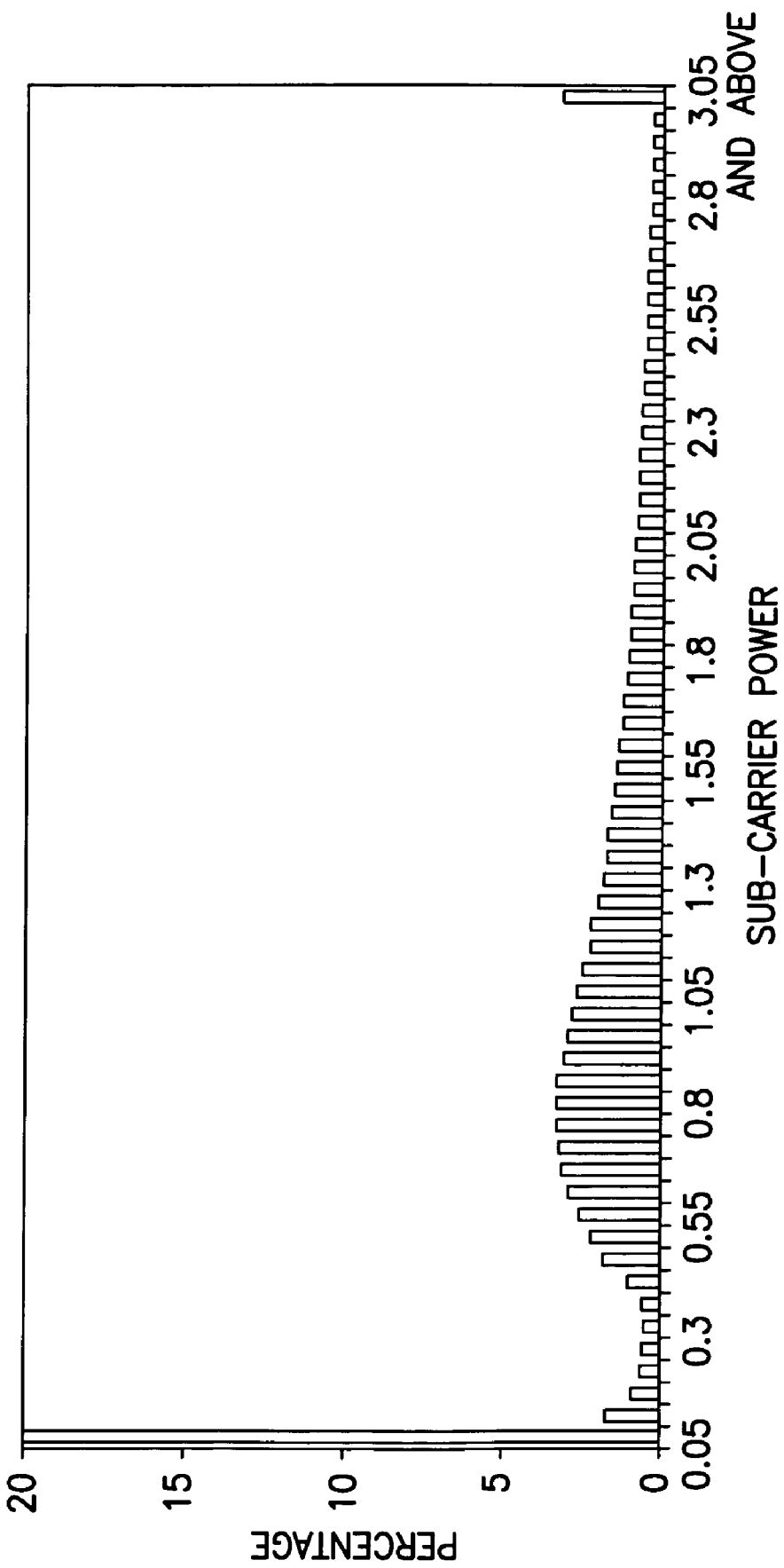
FIG. 7 shows a percentage distribution of sub-carrier power, after gradient ascent search.

To demonstrate the operation of the gradient ascent search method in adjusting the sub-carrier power, the received SNR distributions among the 2040 sub-carriers before and after the optimization may be plotted. FIGS. 5 and 6 show such graphs for a SNR of 4 dB under a 2-path Rayleigh fading channel. The x-axis represents the instantaneous received sub-carrier SNR after the channel fade in bins of 0.5 dB, and the y-axis represents the percentage distribution of the number of sub-carriers with the corresponding instantaneous SNR averaged over 2000 frames. That is, the plot may be regarded as ergodic probability density function (PDF) distributions of the sub-carriers' received SNR. When compared with the TP curve in FIG. 1, it is readily seen that the gradient search method has shifted the bad sub-carriers substantially to the left of the lower sigmoid knee, with very low resultant SNR. Conversely the good sub-carriers have their power increased, resulting in a large percentage of sub-carriers to the right of the upper sigmoid knee. The PDF distributions of the sub-carrier power are plotted in FIG. 7. There it is seen that the gradient ascent search adjusts the power, starting from unity in all sub-carriers, to a distribution spanning from zero to greater than three units. It may be interpreted that the bad sub-carriers have their power reduced, resulting in little or no contribution to the total throughput, while the good sub-carriers make their optimal contributions under the given channel condition.

Figure 8:
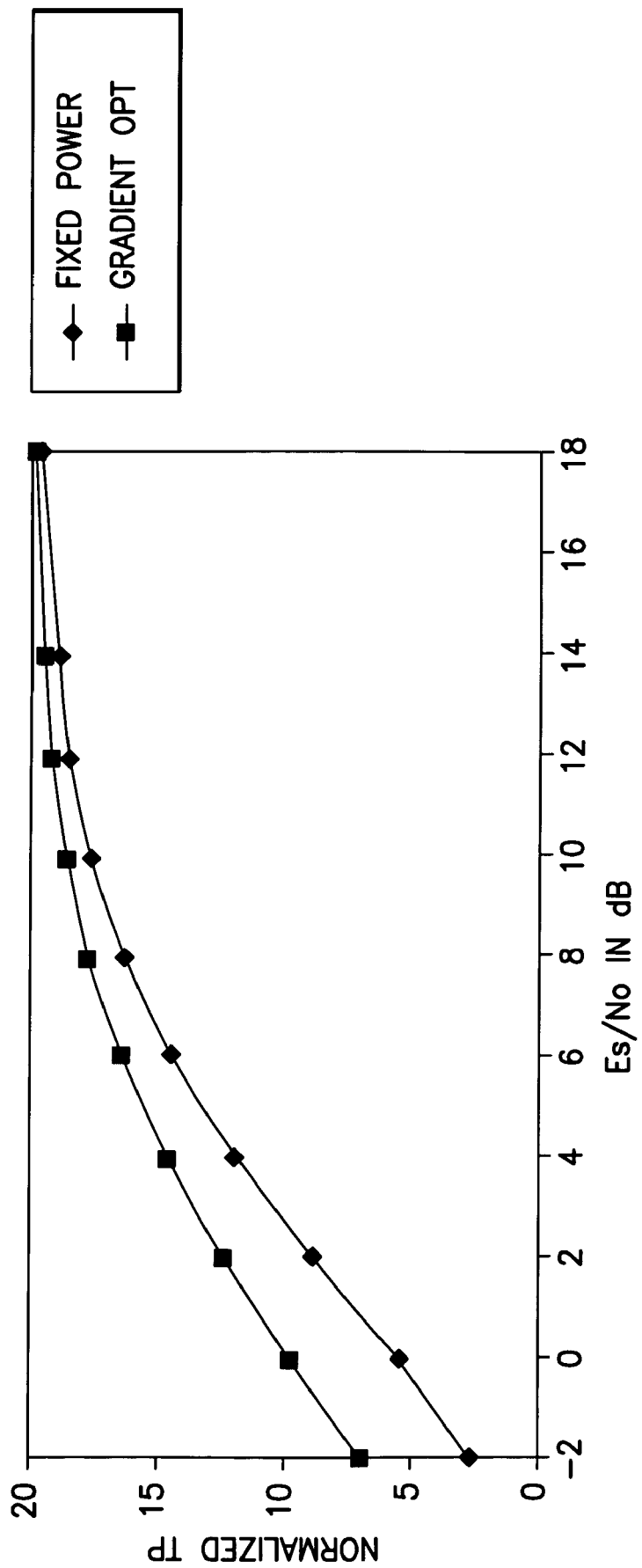
FIG. 8 graphically depicts a throughput comparison between fixed power loading and adaptive power loading with gradient ascent search and QPSK modulation.
Figure 9:
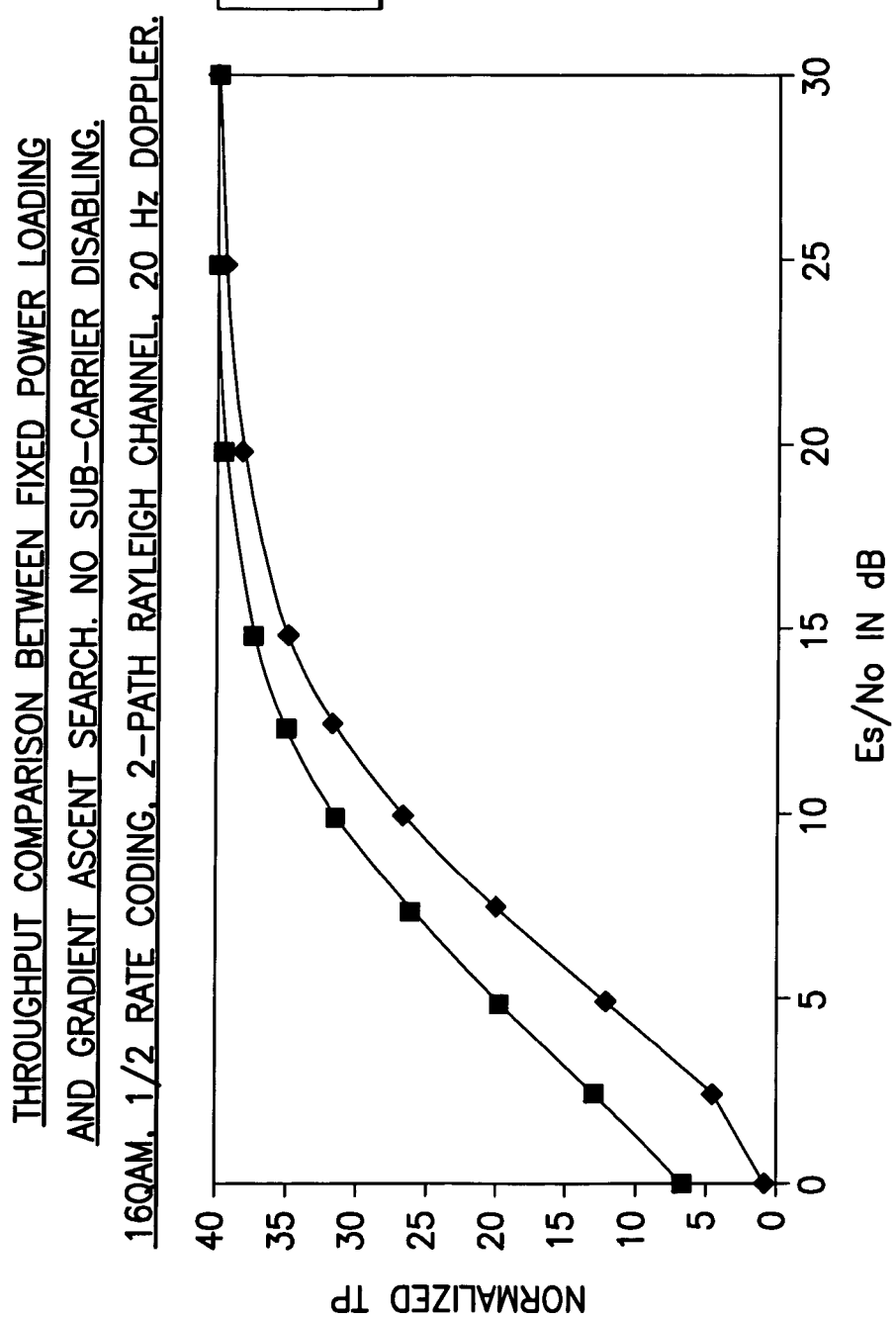
FIG. 9 graphically depicts a throughput comparison between fixed power loading and adaptive power loading with gradient ascent search and 16QAM.

The results of simulations are now provided to further illustrate the utility of the gradient ascent search method in accordance with the preferred embodiments of this invention. The first results are provided for the case of no sub-carrier disabling, where a single gradient ascent search is performed to optimize the power (FIG. 14), starting with an equal power distribution across the sub-carriers. All of the sub-carriers are loaded with data, with the resultant power allocation, and no sub-carriers are disabled. FIG. 8 shows the TP vs. SNR curves before and after the optimization for the QPSK modulation case. It is clearly seen that the TP is much improved, especially at low SNRs, by up to about 3 dB. FIG. 9 depicts the corresponding results for 16QAM. Again, up to about a 3 dB improvement is obtained.

Figure 10:
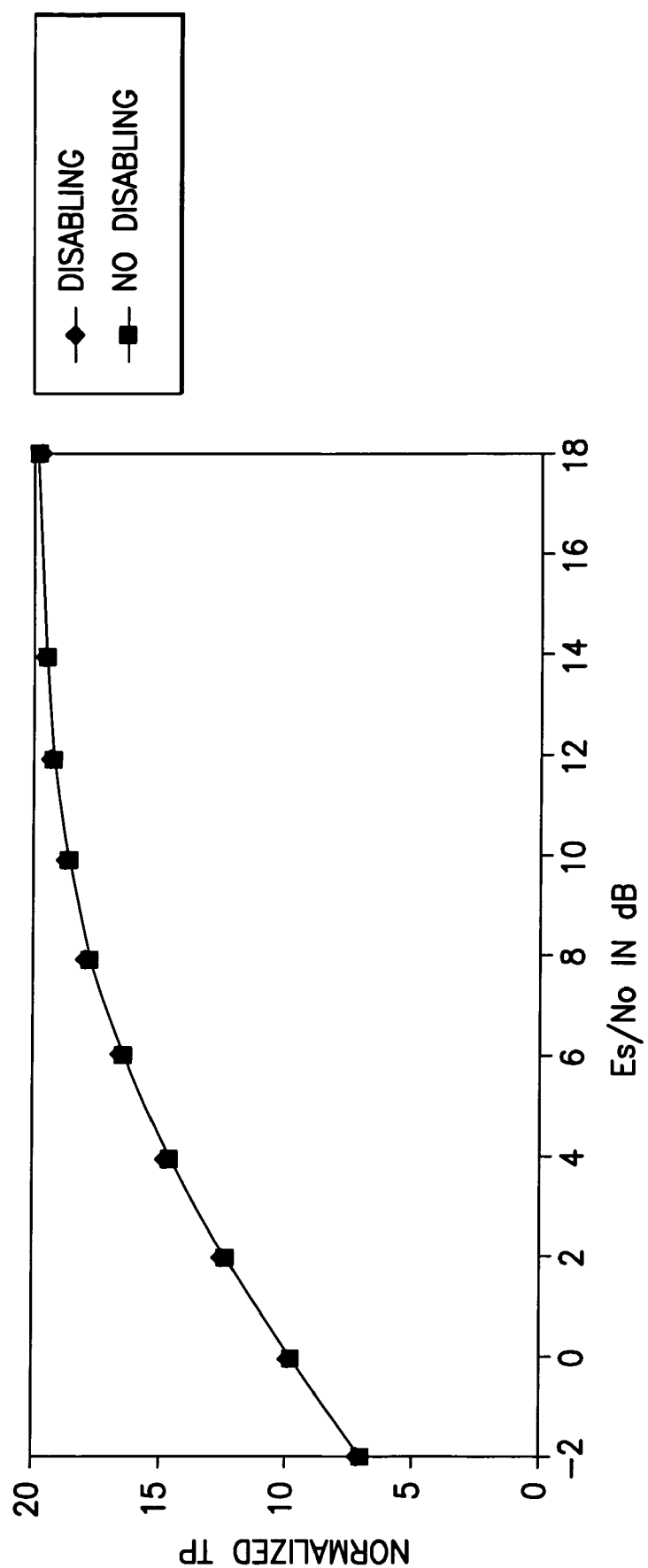
FIG. 10 graphically depicts a throughput comparison between gradient ascent searches, with and without sub-carrier disabling, for the QPSK modulation case.
Figure 11:
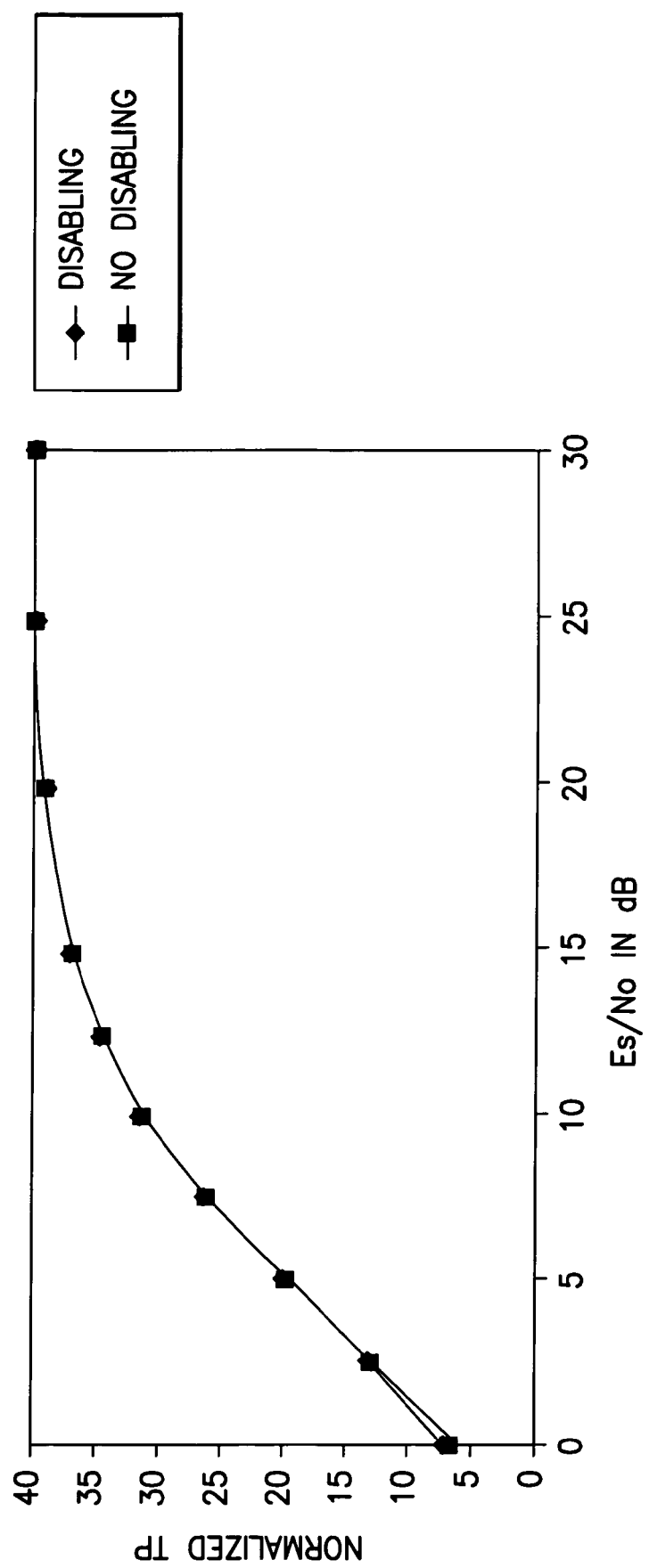
FIG. 11 graphically depicts a throughput comparison between gradient ascent searches, with and without sub-carrier disabling, for the 16QAM case.

For the case of the gradient ascent search with sub-carrier disabling, the two stage gradient ascent search (FIG. 16) is performed to optimize the power. The first stage is performed in the same way as described for FIG. 14. The sub-carriers with a resultant received SNR lower than a threshold of, for example, −1 dB (for QPSK, 2 dB for 16QAM) are then identified and disabled, and their power is removed and given to the remaining good sub-carriers via the second search stage. It can be noted that since the gradient ascent search pushes the received SNRs of the bad sub-carriers to well below 0 dB, the selection of the cut-off threshold value is not critical, and only marginally affects the outcome. FIGS. 10 and 11 show the TP vs. SNR curves for QPSK & 16QAM, respectively. Also plotted in these two figures are the no sub-carrier disabling results from FIGS. 8 and 9. The TP curves are virtually identical, suggesting that no further improvement in throughput is obtained with sub-carrier disabling. This is not surprising, since the contributions of the bad sub-carriers to the total throughput are minimal, and thus removing the bad sub-carriers does not cause any significant changes to the throughput. Further, since the good sub-carriers are already located around or beyond the upper knee of the sigmoid curve, giving them more power would not also produce a noteworthy throughput increase.

Figure 12:
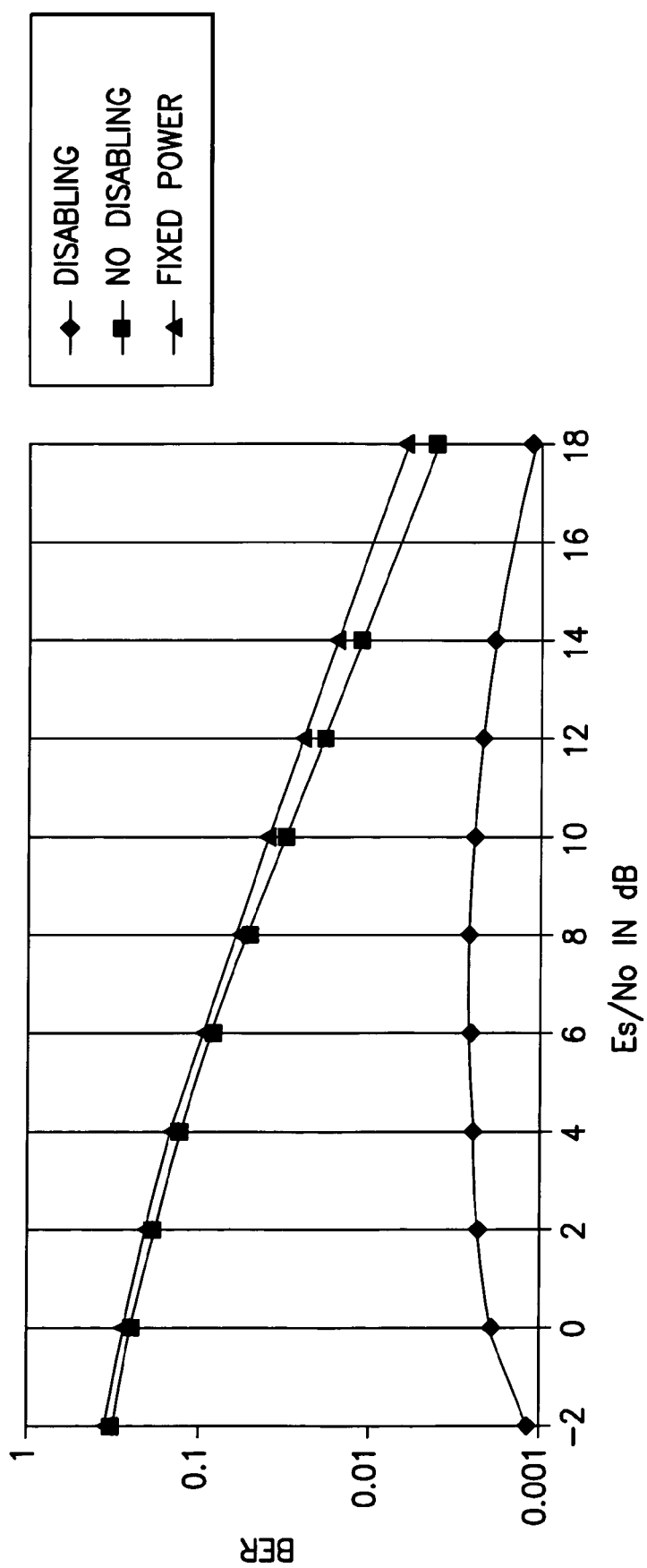
FIG. 12 graphically provides a BER comparison between gradient ascent searches and fixed power loading, for the QPSK modulation case.
Figure 13:
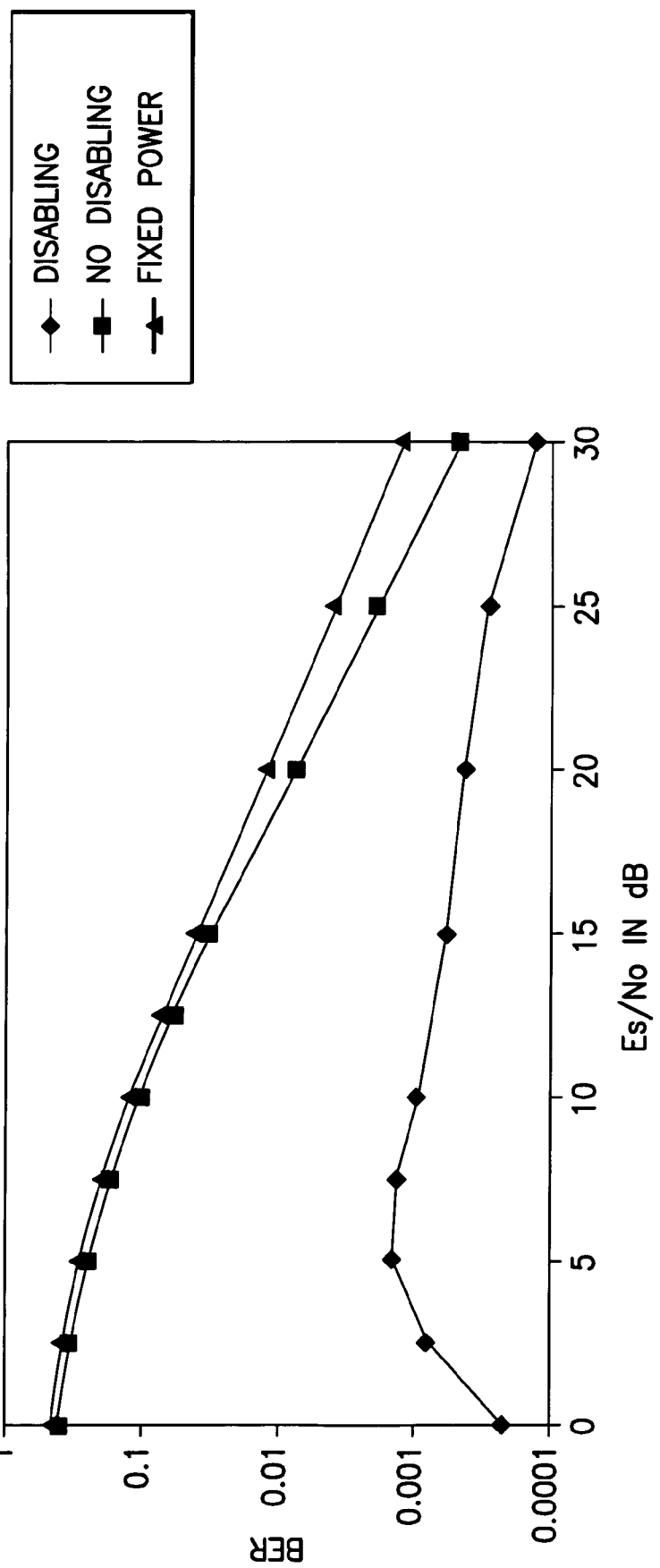
FIG. 13 graphically provides a BER comparison between gradient ascent searches and fixed power loading, for the 16QAM case.

As the bad sub-carriers have low SNRs, and the data packets they carry are most likely to be corrupted, disabling them can significantly reduce the BER (and PER). FIGS. 12 and 13 depict the resultant BER graphs resulting from the two-stage search with sub-carrier disabling for QPSK & 16QAM, respectively. Also shown in FIGS. 12 and 13 are the corresponding curves without sub-carrier disabling (i.e., with the single stage gradient ascent search of FIG. 14) and without the use of the gradient ascent search (i.e., fixed power across all sub-carriers). It can be seen that a substantial improvement is achieved across the entire SNR range. Therefore it may be regarded that a significant advantage of the use of the two stage search is a reduction in BER (and PER), while maintaining the same increase in the throughput.

Based on the foregoing description, it can be appreciated that a new approach for throughput optimization is herein presented that is operable for both coded and un-coded OFDM systems. The gradient ascent search method operates so as to maximize the throughput by adapting the sub-carrier power using an analytically based, constrained gradient ascent with a backtrack-track-line search. The method performs a gradient search along the throughput curve by varying the power of the sub-carriers, which results in alternations of the instantaneous received SNR of the sub-carriers. Simulations for the QPSK and 16QAM cases were shown to reveal that up to a 3 dB improvement may be obtained. By disabling the bad sub-carriers, BER (and PER) may also be significantly reduced, without sacrificing the increased throughput.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent hardware embodiments may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method to increase data throughput in an orthogonal frequency division multiplex (OFDM) wireless communications system, comprising:
   modeling data throughput as a function of received Signal to Noise Ratio (SNR) with a sigmoid function to produce a throughput curve characterized as having a lower knee region and an upper knee region; and
   performing a gradient ascent search along the throughput curve by varying the power of a plurality of sub-carriers so as to remove power from any sub-carrier having a received SNR to the left of the lower knee region, and to re-allocate the removed power to sub-carriers having a received SNR to the right of the lower knee region.

2. The method of claim 1, where different modulation and coding schemes are used in individual sub-carriers at different times.

3. The method of claim 2, further comprising improving error rate performance by disabling any sub-carrier whose power is removed.

4. The method as in claim 3, where performing the gradient ascent search comprises:
   initiating a first stage of the gradient ascent search by initializing the power of all sub-carriers to be equal, such that all elements of a transmitted power vector $P^{(n)}$ are set to have the same value;
   evaluating a resultant total data throughput using a current value of the transmitted power vector $P^{(n)}$ to obtain a first data throughput value;
   finding a search direction vector $g_n$;
   determining a step size $\alpha_n$;
   updating the transmitted power vector $P^{(n)}$;
   updating the received SNR for each sub-carrier using the sub-carrier's power allocation as indicated by the updated transmitted power vector $P^{(n)}$; sub-channel frequency function; and noise power;
   comparing the updated received SNR for each sub-carrier to a look-up table created with cross-over points of the sigmoid curves and selecting sigmoid parameters that result in highest throughput for the sub-carrier;

evaluating a total data throughput with the updated transmitted power vector $P^{(n)}$ to obtain an updated data throughput value; and if the updated data throughput value is improved relative to the first data throughput value, completing an iteration of the gradient ascent search, incrementing n, and returning to finding the search direction vector to perform another iteration, else if the updated data throughput value is not improved relative to the first data throughput value, or if some predetermined number of interactions have been completed, initiating a second stage of the gradient ascent search by evaluating the received SNR of every sub-carrier resultant from the transmitted power vector $P^{(n)}$;

if the received SNR of a particular one of the sub-carriers is less than a predetermined threshold established for that sub-carrier, identifying that sub-carrier as one to be disabled;

re-assigning power from any identified sub-carriers to remaining sub-carriers; and returning to finding the search direction vector to form the second stage gradient ascent search for the remaining sub-carriers.

5. The method of claim 4 where after terminating the gradient ascent search the transmitted power vector $P^{(n)}$ is a final power vector that dictates the power in the retained sub-carriers, each of the retained sub-carriers is loaded with a data symbol from an associated packet of a set of packets forming an OFDM symbol to be transmitted through a channel, where the transmitted power vector $P^{(n)}$ is maintained unchanged throughout the transmission of the set of packets, and upon completion of a frame of OFDM symbols, returning to initialize the power of all sub-carriers to be equal and repeating the gradient ascent search for a next set of packets.

6. The method of claim 4, where after terminating the gradient ascent search the transmitted power vector $P^{(n)}$ is a final power vector that dictates the power in the retained sub-carriers, the method further comprising:

spreading a plurality of data packets across the retained sub-carriers, where the plurality of packets spread across the retained sub-carriers form an OFDM symbol;

transmitting the OFDM symbol through a channel;

maintaining the transmitted power vector $P^{(n)}$ unchanged throughout the transmission of the OFDM symbol; and upon completion of transmission of the OFDM symbol, returning to initialize the power of all sub-carriers to be equal and repeating the gradient ascent search for a next OFDM symbol.

7. The method of claim 6, where the data packets are spread across the retained sub-carriers in a manner to ensure that the data packets share similar error probabilities.

8. The method of claim 4, where after terminating the gradient ascent search the transmitted power vector $P^{(n)}$ is a final power vector that dictates the power in the retained sub-carriers, the method further comprising:

selecting a time interval corresponding to the time required to transmit at least two OFDM symbols in succession, where the transmitted power vector $P^{(n)}$ will be maintained unchanged throughout the selected time interval;

spreading a first plurality of data packets across the retained sub-carriers, where the first plurality of packets spread across the sub-carriers form a first OFDM symbol;

transmitting the first OFDM symbol through a channel;

spreading a second plurality of data packets across the retained sub-carriers, where the second plurality of packets spread across the sub-carriers form a second OFDM symbol;

transmitting the second OFDM symbol through the channel;

continuing to successively spread pluralities of data packets across the retained sub-carriers and to transmit the resulting OFDM symbols through the channel until the selected time interval is reached; and returning to initialize the power of all sub-carriers to be equal and repeating the gradient ascent search for a next time interval.

9. The method of claim 8, where the data packets are spread across the retained sub-carriers in a manner to ensure that the data packets share similar error probabilities.

10. The method of claim 2, where performing the gradient ascent search comprises:

initializing the power of all sub-carriers to be equal, such that all elements of a transmitted power vector $P^{(n)}$ are set to have the same value;

evaluating a resultant total data throughput using a current value of the transmitted power vector $P^{(n)}$ to obtain a first data throughput value;

finding a search direction vector $g_n$;

determining a step size $\alpha_n$;

updating the transmitted power vector $P^{(n)}$;

updating the received SNR for each sub-carrier using the sub-carrier's power allocation as indicated by the updated transmitted power vector $P^{(n)}$; sub-channel frequency function; and noise power;

comparing the updated received SNR for each sub-carrier to a look-up table created with cross-over points of the sigmoid curves and selecting sigmoid parameters that result in highest throughput for the sub-carrier;

evaluating a total data throughput with the updated transmitted power vector $P^{(n)}$ to obtain an updated data throughput value; and if the updated data throughput value is improved relative to the first data throughput value, completing an iteration of the gradient ascent search, incrementing n, and returning to finding the search direction vector to perform another iteration, else if the updated data throughput value is not improved relative to the first data throughput value, or if some predetermined number of interactions have been completed, terminating the gradient ascent search.

11. The method of claim 10, where after terminating the gradient ascent search $P^{(n)}$ is a final power vector that dictates the power in the plurality of sub-carriers, each of the sub-carriers is loaded with a data symbol from an associated packet of a set of packets forming an OFDM symbol to be transmitted through a channel, where the transmitted power vector $P^{(n)}$ is maintained unchanged throughout the transmission of the set of packets, and upon completion of a frame of OFDM symbols, returning to initialize the power of all sub-carriers to be equal and repeating the gradient ascent search for a next set of packets.

12. The method of claim 10, where after terminating the gradient ascent search the transmitted power vector $P^{(n)}$ is a final power vector that dictates the power in the plurality of sub-carriers, the method further comprising:

spreading a plurality of data packets across the sub-carriers, where the plurality of packets spread across the sub-carriers form an OFDM symbol;

transmitting the OFDM symbol through a channel;
maintaining the transmitted power vector $P^{(n)}$ unchanged throughout the transmission of the OFDM symbol; and
upon completion of transmission of the OFDM symbol, returning to initialize the power of all sub-carriers to be equal and repeating the gradient ascent search for a next OFDM symbol.

13. The method of claim 12, where the data packets are spread across the sub-carriers in a manner to ensure that the data packets share similar error probabilities.

14. The method of claim 10, where after terminating the gradient ascent search the transmitted power vector $P^{(n)}$ is a final power vector that dictates the power in the plurality of sub-carriers, the method further comprising:
selecting a time interval corresponding to the time required to transmit at least two OFDM symbols in succession, where the transmitted power vector $P^{(n)}$ will be maintained unchanged throughout the selected time interval;
spreading a first plurality of data packets across the sub-carriers, where the first plurality of packets spread across the sub-carriers form a first OFDM symbol;
transmitting the first OFDM symbol through a channel;
spreading a second plurality of data packets across the sub-carriers, where the second plurality of packets spread across the sub-carriers form a second OFDM symbol;
transmitting the second OFDM symbol through the channel;
continuing to successively spread pluralities of data packets across the sub-carriers and to transmit the resulting OFDM symbols through the channel until the selected time interval is reached; and
returning to initialize the power of all sub-carriers to be equal and repeating the gradient ascent search for a next time interval.

15. The method of claim 14, where the data packets are spread across the sub-carriers in a manner to ensure that the data packets share similar error probabilities.

16. The method of claim 1, further comprising improving error rate performance by disabling any sub-carrier whose power is removed.

17. The method of claim 16, where performing the gradient ascent search occurs in stages, where during a first stage the method identifies sub-carriers to be disabled, and where during a second stage the method allocates power to retained sub-carriers at the expense of disabled sub-carriers.

18. The method as in claim 16, where performing the gradient ascent search comprises:
initiating a first stage of the gradient ascent search by initializing the power of all sub-carriers to be equal, such that all elements of a transmitted power vector $P^{(n)}$ are set to have the same value;
evaluating a resultant total data throughput using a current value of the transmitted power vector $P^{(n)}$ to obtain a first data throughput value;
finding a search direction vector $g_n$;
determining a step size $\alpha_n$;
updating the transmitted power vector $P^{(n)}$;
evaluating a total data throughput with the updated transmitted power vector $P^{(n)}$ to obtain an updated data throughput value; and
if the updated data throughput value is improved relative to the first data throughput value, completing an iteration of the gradient ascent search, incrementing n, and returning to finding the search direction vector to perform another iteration, else if the updated data throughput value is not improved relative to the first data throughput value, or if some predetermined number of interactions have been completed,
initiating a second stage of the gradient ascent search by evaluating the received SNR of every sub-carrier resultant from the transmitted power vector $P^{(n)}$;
if the received SNR of a particular one of the sub-carriers is less than a predetermined threshold, identifying that sub-carrier as one to be disabled;
re-assigning power from any identified sub-carriers to remaining sub-carriers; and
returning to finding the search direction vector to form the second stage gradient ascent search for the remaining sub-carriers.

19. The method of claim 18 where after terminating the gradient ascent search the transmitted power vector $P^{(n)}$ is a final power vector that dictates the power in the retained sub-carriers, each of the retained sub-carriers is loaded with a data symbol from an associated packet of a set of packets forming an OFDM symbol to be transmitted through a channel, where the transmitted power vector $P^{(n)}$ is maintained unchanged throughout the transmission of the set of packets, and upon completion of a frame of OFDM symbols, returning to initialize the power of all sub-carriers to be equal and repeating the gradient ascent search for a next set of packets.

20. The method of claim 18, where after terminating the gradient ascent search the transmitted power vector $P^{(n)}$ is a final power vector that dictates the power in the retained sub-carriers, the method further comprising:
spreading a plurality of data packets across the retained sub-carriers, where the plurality of packets spread across the retained sub-carriers form an OFDM symbol;
transmitting the OFDM symbol through a channel;
maintaining the transmitted power vector $P^{(n)}$ unchanged throughout the transmission of the OFDM symbol; and
upon completion of transmission of the OFDM symbol, returning to initialize the power of all sub-carriers to be equal and repeating the gradient ascent search for a next OFDM symbol.

21. The method of claim 20, where the data packets are spread across the retained sub-carriers in a manner to ensure that the data packets share similar error probabilities.

22. The method of claim 18, where after terminating the gradient ascent search the transmitted power vector $P^{(n)}$ is a final power vector that dictates the power in the retained sub-carriers, the method further comprising:
selecting a time interval corresponding to the time required to transmit at least two OFDM symbols in succession, where the transmitted power vector $P^{(n)}$ will be maintained unchanged throughout the selected time interval;
spreading a first plurality of data packets across the retained sub-carriers, where the first plurality of packets spread across the sub-carriers form a first OFDM symbol;
transmitting the first OFDM symbol through a channel;
spreading a second plurality of data packets across the retained sub-carriers, where the second plurality of packets spread across the sub-carriers form a second OFDM symbol;
transmitting the second OFDM symbol through the channel;
continuing to successively spread pluralities of data packets across the retained sub-carriers and to transmit the resulting OFDM symbols through the channel until the selected time interval is reached; and
returning to initialize the power of all sub-carriers to be equal and repeating the gradient ascent search for a next time interval.

23. The method of claim 22, where the data packets are spread across the retained sub-carriers in a manner to ensure that the data packets share similar error probabilities.

24. The method of claim 1, further comprising, for sub-carriers between the upper and lower sigmoid curve knee regions, increasing the power of the sub-carriers within a total power constraint so as to be to the right of the sigmoid curve upper knee region.

25. The method of claim 1, where performing the gradient ascent search comprises:
   initializing the power of all sub-carriers to be equal, such that all elements of a transmitted power vector $P^{(n)}$ are set to have the same value;
   evaluating a resultant total data throughput using a current value of the transmitted power vector $P^{(n)}$ to obtain a first data throughput value;
   finding a search direction vector $g_n$;
   determining a step size $\alpha_n$;
   updating the transmitted power vector $P^{(n)}$;
   evaluating a total data throughput with the updated transmitted power vector $P^{(n)}$ to obtain an updated data throughput value; and
   if the updated data throughput value is improved relative to the first data throughput value, completing an iteration of the gradient ascent search, incrementing n, and returning to finding the search direction vector to perform another iteration, else if the updated data throughput value is not improved relative to the first data throughput value, or if some predetermined number of interactions have been completed, terminating the gradient ascent search.

26. The method of claim 25, where after terminating the gradient ascent search $P^{(n)}$ is a final power vector that dictates the power in the plurality of sub-carriers, each of the sub-carriers is loaded with a data symbol from an associated packet of a set of packets forming an OFDM symbol to be transmitted through a channel, where the transmitted power vector $P^{(n)}$ is maintained unchanged throughout the transmission of the set of packets, and upon completion of a frame of OFDM symbols, returning to initialize the power of all sub-carriers to be equal and repeating the gradient ascent search for a next set of packets.

27. The method of claim 25, where after terminating the gradient ascent search the transmitted power vector $P^{(n)}$ is a final power vector that dictates the power in the plurality of sub-carriers, the method further comprising:
   spreading a plurality of data packets across the sub-carriers, where the plurality of packets spread across the sub-carriers form an OFDM symbol;
   transmitting the OFDM symbol through a channel;
   maintaining the transmitted power vector $P^{(n)}$ unchanged throughout the transmission of the OFDM symbol; and
   upon completion of transmission of the OFDM symbol, returning to initialize the power of all sub-carriers to be equal and repeating the gradient ascent search for a next OFDM symbol.

28. The method of claim 27, where the data packets are spread across the sub-carriers in a manner to ensure that the data packets share similar error probabilities.

29. The method of claim 25, where after terminating the gradient ascent search the transmitted power vector $P^{(n)}$ is a final power vector that dictates the power in the plurality of sub-carriers, the method further comprising:
   selecting a time interval corresponding to the time required to transmit at least two OFDM symbols in succession, where the transmitted power vector $P^{(n)}$ will be maintained unchanged throughout the selected time interval;
   spreading a first plurality of data packets across the sub-carriers, where the first plurality of packets spread across the sub-carriers form a first OFDM symbol;
   transmitting the first OFDM symbol through a channel;
   spreading a second plurality of data packets across the sub-carriers, where the second plurality of packets spread across the sub-carriers form a second OFDM symbol;
   transmitting the second OFDM symbol through the channel;
   continuing to successively spread pluralities of data packets across the sub-carriers and to transmit the resulting OFDM symbols through the channel until the selected time interval is reached; and
   returning to initialize the power of all sub-carriers to be equal and repeating the gradient ascent search for a next time interval.

30. The method of claim 29, where the data packets are spread across the sub-carriers in a manner to ensure that the data packets share similar error probabilities.

31. Apparatus operable to increase data throughput in an orthogonal frequency division multiplex (OFDM) wireless communications system, comprising at least one data processor operating under control of a stored program, and coupled to OFDM transmission circuitry, to model data throughput as a function of received Signal to Noise Ratio (SNR) with a sigmoid function to produce a throughput curve characterized as having a lower knee region and an upper knee region; and to perform a gradient ascent search along the throughput curve by varying the power of a plurality of sub-carriers so as to remove power from any sub-carrier having a received SNR to the left of the lower knee region, and to re-allocate the removed power to sub-carriers having a received SNR to the right of the lower knee region.

32. The apparatus of claim 31, where different modulation and coding schemes are used in individual sub-carriers at different times.

33. The apparatus of claim 32, where said at least one data processor is further operable to improve error rate performance by disabling any sub-carrier whose power is removed.

34. The apparatus of claim 33, where said at least one data processor is operable while performing the gradient ascent search to perform the search in stages, where during a first stage said at least one data processor is operable to identify sub-carriers to be disabled, and where during a second stage said at least one data processor is operable to allocate power to retained sub-carriers at the expense of disabled sub-carriers.

35. The apparatus of claim 33, where said at least one data processor is operable while performing a first stage of the gradient ascent search to initialize the power of all sub-carriers to be equal, such that all elements of a transmitted power vector $P^{(n)}$ are set to have the same value; to evaluate a resultant total data throughput using a current value of the transmitted power vector $P^{(n)}$ to obtain a first data throughput value; to find a search direction vector $g_n$; to determine a step size $\alpha_n$; to update the transmitted power vector $P^{(n)}$; to evaluate a total data throughput with the updated transmitted power vector $P^{(n)}$ to obtain an updated data throughput value; and if the updated data throughput value is improved relative to the first data throughput value, to complete an iteration of the gradient ascent search, to increment n, and to return to finding the search direction vector to perform another iteration, else if the updated data throughput value is not improved relative to the first data throughput value, or if some predetermined number of interactions have been completed, said at least one data processor is further operable to initiate a second stage of the gradient ascent search by evaluating the received SNR of every sub-carrier resultant from the transmitted power vector $P^{(n)}$ and if the received SNR of a particular one of the sub-carriers is found to be less than a predetermined threshold, to identify that sub-carrier as one to be disabled; to re-assign power from any identified sub-carriers to remaining sub-carriers; and to return to finding the search direction vector to perform the second stage gradient ascent search for the remaining sub-carriers.

36. The apparatus of claim 35, where after terminating the gradient ascent search the transmitted power vector $P^{(n)}$ is a final power vector that dictates the power in the retained sub-carriers, where said at least one data processor is further operable to load retained sub-carriers with a symbol from an associated packet of a set of packets forming an OFDM symbol to be transmitted through a channel, to maintain the transmitted power vector $P^{(n)}$ unchanged throughout the transmission of set of packets, and upon completion of a frame of OFDM symbols, to return to initialize the power of all sub-carriers to be equal and to repeat the gradient ascent search for a next set of packets.

37. The apparatus of claim 35, where after terminating the gradient ascent search the transmitted power vector $P^{(n)}$ is a final power vector that dictates the power in the retained sub-carriers, and where the at least one data processor is further operable to spread a plurality of data packets across the retained sub-carriers, where the plurality of packets spread across the retained sub-carriers form an OFDM symbol; to transmit the OFDM symbol through a channel; to maintain the transmitted power vector $P^{(n)}$ unchanged throughout the transmission of the OFDM symbol; and upon completion of transmission of the OFDM symbol, to return to initialize the power of all sub-carriers to be equal and to repeat the gradient ascent search for a next OFDM symbol.

38. The apparatus of claim 37, where the data packets are spread across the retained sub-carriers in a manner to ensure that the data packets share similar error probabilities.

39. The apparatus of claim 35, where after terminating the gradient ascent search the transmitted power vector $P^{(n)}$ is a final power vector that dictates the power in the retained sub-carriers, and where the at least one data processor is further operable to select a time interval corresponding to the time required to transmit at least two OFDM symbols in succession, where the transmitted power vector $P^{(n)}$ will be maintained unchanged throughout the selected time interval; to spread a first plurality of data packets across the retained sub-carriers, where the plurality of packets spread across the retained sub-carriers form a first OFDM symbol; to transmit the first OFDM symbol through a channel; to spread a second plurality of data packets across the retained sub-carriers, where the second plurality of packets spread across the sub-carriers form a second OFDM symbol; to transmit the second OFDM symbol through the channel; to continue to successively spread pluralities of data packets across the retained sub-carriers and to transmit the resulting OFDM symbols through the channel until the selected time interval is reached; and to return to initialize the power of all sub-carriers to be equal and to repeat the gradient ascent search for a next time interval.

40. The apparatus of claim 39, where the data packets are spread across the retained sub-carriers in a manner to ensure that the data packets share similar error probabilities.

41. The apparatus of claim 31, where said at least one data processor is further operable to improve error rate performance by disabling any sub-carrier whose power is removed.

42. The apparatus of claim 31, where said at least one data processor is further operable, for sub-carriers between the upper and lower sigmoid curve knee regions, to increase the power of the sub-carriers within a total power constraint so as to be to the right of the sigmoid curve upper knee region.

43. The apparatus of claim 31, where at least one data processor is operable while performing the gradient ascent search to initialize the power of all sub-carriers to be equal, such that all elements of a transmitted power vector $P^{(n)}$ are set to have the same value; to evaluate a resultant total data throughput using a current value of the transmitted power vector $P^{(n)}$ to obtain a first data throughput value; to find a search direction vector $g_n$; to determine a step size $\alpha_n$; to update the transmitted power vector $P^{(n)}$; to evaluate a total data throughput with the updated transmitted power vector $P^{(n)}$ to obtain an updated data throughput value; and if the updated data throughput value is improved relative to the first data throughput value, to complete an iteration of the gradient ascent search, to increment n, and to return to finding the search direction vector to perform another iteration; else, if the updated data throughput value is not improved relative to the first data throughput value, or if some predetermined number of interactions have been completed, to terminate the gradient ascent search.

44. The apparatus of claim 43, where after terminating the gradient ascent search the transmitted power vector $P^{(n)}$ is a final power vector that dictates the power in the plurality of sub-carriers, where said at least one data processor is further operable to load sub-carriers with a symbol from an associated packet of a set of packets forming an OFDM symbol to be transmitted through a channel, to maintain the transmitted power vector $P^{(n)}$ unchanged throughout the transmission of set of packets, and upon completion of a frame of OFDM symbols, to return to initialize the power of all sub-carriers to be equal and to repeat the gradient ascent search for a next set of packets.

45. The apparatus of claim 43, where after terminating the gradient ascent search the transmitted power vector $P^{(n)}$ is a final power vector that dictates the power in the plurality of sub-carriers, and where the at least one data processor is further operable to spread a plurality of data packets across the sub-carriers, where the plurality of packets spread across the sub-carriers form an OFDM symbol; to transmit the OFDM symbol through a channel; to maintain the transmitted power vector $P^{(n)}$ unchanged throughout the transmission of the OFDM symbol; and upon completion of transmission of the OFDM symbol, to return to initialize the power of all sub-carriers to be equal and to repeat the gradient ascent search for a next OFDM symbol.

46. The apparatus of claim 45, where the data packets are spread across the sub-carriers in a manner to ensure that the data packets share similar error probabilities.

47. The apparatus of claim 43, where after terminating the gradient ascent search the transmitted power vector $P^{(n)}$ is a final power vector that dictates the power in the plurality of sub-carriers, and where the at least one data processor is further operable to select a time interval corresponding to the time required to transmit at least two OFDM symbols in succession, where the transmitted power vector $P^{(n)}$ will be maintained unchanged throughout the selected time interval; to spread a first plurality of data packets across the sub-carriers, where the first plurality of packets spread across the sub-carriers form a first OFDM symbol; to transmit the first OFDM symbol through a channel; to spread a second plurality of data packets across the sub-carriers, where the second plurality of packets spread across the sub-carriers form a second OFDM symbol; to transmit the second OFDM symbol through the channel; to continue to successively spread pluralities of data packets across the sub-carriers and to transmit the resulting OFDM symbols through the channel until the selected time interval is reached; and to return to initialize the power of all sub-carriers to be equal and to repeat the gradient ascent search for a next time interval.

48. The apparatus of claim 47, where the data packets are spread across the sub-carriers in a manner to ensure that the data packets share similar error probabilities.

49. A computer readable memory medium storing computer program instructions, the computer program instructions configured to increase data throughput in an orthogonal frequency division multiplex (OFDM) wireless communications system, wherein when the computer program instructions are executed by processing apparatus operations are performed, the operations comprising: performing a gradient ascent search along a data throughput curve, where the data throughput curve is modeled using a received Signal to Noise Ratio (SNR) as a sigmoid function to produce the data throughput curve to be characterized as having a lower knee region and an upper knee region, said gradient ascent search operating to vary the power of a plurality of sub-carriers so as to remove power from any sub-carrier having a received SNR to the left of the lower knee region, and to re-allocate the removed power to sub-carriers having a received SNR to the right of the lower knee region.

50. A computer readable memory medium storing computer program instructions, the computer program instructions configured to increase data throughput in an orthogonal frequency division multiplex (OFDM) wireless communications system, wherein when the computer program instructions are executed by processing apparatus operations are performed, the operations comprising: performing a multi-stage gradient ascent search along a data throughput curve, where the data throughput curve is modeled using received Signal to Noise Ratio (SNR) as a sigmoid function to produce the data throughput curve to be characterized as having a lower knee region and an upper knee region, said gradient ascent search operating to vary the power of a plurality of sub-carriers so as to remove power from any sub-carrier having a received SNR to the left of the lower knee region, and to re-allocate the removed power to sub-carriers having a received SNR to the right of the lower knee region, where during a first stage of the gradient ascent search an operation identifies sub-carriers to be disabled, and where during a second stage of the gradient ascent search a further operation allocates power only to retained sub-carriers at the expense of disabled sub-carriers.

51. Apparatus operable to increase data throughput in an orthogonal frequency division multiplex (OFDM) wireless communications system, comprising data processor means operating under control of a stored program, and coupled to OFDM transmission circuitry, for modeling data throughput as a function of received Signal to Noise Ratio (SNR) with a sigmoid function to produce a throughput curve characterized as having a lower knee region and an upper knee region; and for performing a gradient ascent search along the throughput curve by varying the power of a plurality of sub-carriers so as to remove power from any sub-carrier having a received SNR to the left of the lower knee region, and to re-allocate the removed power to sub-carriers having a received SNR to the right of the lower knee region.

* * * * *